US012640354B2

(12) United States Patent
Kawai et al.

(10) Patent No.: US 12,640,354 B2
(45) Date of Patent: May 26, 2026

(54) PHOTOELECTRIC CONVERSION DEVICE, ELECTROMAGNETIC WAVE DETECTION DEVICE, PHOTOELECTRIC CONVERSION METHOD AND ELECTROMAGNETIC WAVE DETECTION METHOD

(71) Applicant: HAMAMATSU PHOTONICS K.K., Hamamatsu (JP)

(72) Inventors: Naoya Kawai, Hamamatsu (JP); Hideaki Yoshiara, Hamamatsu (JP); Simon Lehnskov Lange, Copenhagen (DK); Peter Uhd Jepsen, Copenhagen (DK)

(73) Assignee: HAMAMATSU PHOTONICS K.K., Hamamatsu (JP)

( * ) Notice: Subject to any disclaimer, the term of this patent is extended or adjusted under 35 U.S.C. 154(b) by 73 days.

(21) Appl. No.: 18/682,295

(22) PCT Filed: Aug. 5, 2022

(86) PCT No.: PCT/EP2022/072070
§ 371 (c)(1),
(2) Date: Feb. 8, 2024

(87) PCT Pub. No.: WO2023/016936
PCT Pub. Date: Feb. 16, 2023

(65) Prior Publication Data
US 2024/0355601 A1    Oct. 24, 2024

(30) Foreign Application Priority Data
Aug. 10, 2021    (EP) ..................................... 21190595

(51) Int. Cl.
*H01J 40/14*        (2006.01)
*G01J 1/42*         (2006.01)
(Continued)

(52) U.S. Cl.
CPC ................. *H01J 40/14* (2013.01); *G01J 1/42* (2013.01); *G01T 1/28* (2013.01); *H01J 40/06* (2013.01);
(Continued)

(58) Field of Classification Search
CPC .. H01J 40/14; H01J 40/06; H01J 40/16; H01J 43/06; H01J 43/28; H01J 43/30; G01J 1/42; G01T 1/28
See application file for complete search history.

(56) References Cited

U.S. PATENT DOCUMENTS

2016/0216201 A1    7/2016    Iwaszczuk et al.
2018/0151338 A1    5/2018    Conley

FOREIGN PATENT DOCUMENTS

EP          4135002 B1  *  12/2024    .............. H01J 40/16
JP          2021-009767 A    1/2021
WO          2020/262254 A1    12/2020

OTHER PUBLICATIONS

Lange, Simon L. et al., "A terahertz and infrared sensitive photo-multiplier tube with a fieldmixing photocathode," 2020 45th International Conference on Infrared, Millimeter, and Terahertz Waves (IRMMW-THZ), IEEE, Nov. 8, 2020, XP033885539.
(Continued)

*Primary Examiner* — Tony Ko
(74) *Attorney, Agent, or Firm* — Faegre Drinker Biddle & Reath LLP

(57)                ABSTRACT
In a photoelectric conversion device, the potential control unit controls electric potentials applied to the meta-surface. The meta-surface includes a plurality of patterns which are space away from each other. The plurality of patterns include an antenna portion and at least one bias portion. The antenna portion extends in a predetermined direction and emits the electron in response to incidence of the electro-magnetic wave. The potential control unit switches a first
(Continued)

state and a second state by controlling the electric potentials applied to the plurality of patterns. In the first state, a component of an electric field from the bias portion toward the antenna portion in a predetermined direction is positive. In the second state, a component of an electric field from the bias portion toward the antenna portion in the predetermined direction is negative.

15 Claims, 10 Drawing Sheets

(51) Int. Cl.

| | | |
|---|---|---|
| *G01T 1/28* | (2006.01) | |
| *H01J 40/06* | (2006.01) | |
| *H01J 40/16* | (2006.01) | |
| *H01J 43/06* | (2006.01) | |
| *H01J 43/28* | (2006.01) | |
| *H01J 43/30* | (2006.01) | |

(52) U.S. Cl.
CPC .............. *H01J 40/16* (2013.01); *H01J 43/06* (2013.01); *H01J 43/28* (2013.01); *H01J 43/30* (2013.01)

(56) References Cited

OTHER PUBLICATIONS

Lange, Simon Lehnskov et al., "Ultrafast THz-driven electron emission from metal metasurfaces," Journal of Applied Physics, American Institute of Physics, 2 Huntington Quadrangle, Melville, vol. 128, No. 7, Aug. 17, 2020, XP012249418.
Turchetti, M. et al., "Low-Energy Optical Pulse Detection using Biased Plasmonic Nanoantennas," 2020 Conference on Lasers and Electro-Optics (CLEO), OSA, May 10, 2020, pp. 1-2, XP033822957.
Written Opinion Of the International Searching Authority mailed Nov. 4, 2022 for PCT/EP2022/072070.
Lange, "Terahertz-Enabled Ultrafast Electron Field Emission", DTU Library, DK, 2020, pp. 125-162, 39 Pages.

* cited by examiner

20

41A   42A  34A  42A  34A           22A   P2   21

72

38A
49
39A

73

44A  36A  45A  36A  45A   25A          P2

21b
31A
49a
P1
47A

71

32A
49
49b
33A

PHOTOELECTRIC CONVERSION DEVICE, ELECTROMAGNETIC WAVE DETECTION DEVICE, PHOTOELECTRIC CONVERSION METHOD AND ELECTROMAGNETIC WAVE DETECTION METHOD

TECHNICAL FIELD

An aspect of the present invention relates to a photoelectric conversion device, an electromagnetic wave detection device, a photoelectric conversion method and an electromagnetic wave detection method.

BACKGROUND

Typically there are four types of electron emission such as thermionic emission, photoelectric emission, secondary emission, and field emission. The thermionic emission is achieved by heating electrode. The photoelectric emission is achieved by application of photons. The secondary emission is achieved by bombarding light speed electron. The field emission is achieved in the presence of electrostatic field. US Patent Application Publication No. 2016/0216201 describes an electromagnetic wave detection system which detects an electromagnetic wave. The system includes a photoelectric conversion device which converts an electromagnetic wave into an electron. The photoelectric conversion device is provided with an electron emitter having a metamaterial structure. The system detects an electromagnetic wave entering the electron emitter.

SUMMARY

The electron emitter of the photoelectric conversion device mentioned above emits an electron in response to incidence of the electromagnetic wave. The system detects the entered electromagnetic wave on the basis of the electron emitted from the electron emitter. According to the system mentioned above, for example, a terahertz-wave can be detected. However, an electric field strength of the electromagnetic wave cannot be measured for each polarity even by using the system. The term "polarity" means, for example, each of a positive component and a negative component in a predetermined direction.

As a technique for detecting a waveform of the terahertz wave, there has been known an electro-optic (EO) sampling using a terahertz time-domain spectroscopy (THz-TDS). According to the technique, the electric field strength of the electromagnetic wave can be measured for each polarity. However, a system using the technique requires an incidence of laser beam in addition to the electromagnetic wave to be measured, and requires a complicated optical system using a prism, a mirror and a lens.

An object of an aspect of the present invention is to provide a photoelectric conversion device capable of achieving measurement of an electric field strength of an electromagnetic wave for each polarity with a simple configuration. An object of the other aspect of the present invention is to provide an electromagnetic wave detection device capable measuring an electric field strength of an electromagnetic wave for each polarity with a simple configuration. An object of further the other aspect of the present invention is to provide a photoelectric conversion method capable of easily achieving measurement of an electric field strength of an electromagnetic wave for each polarity. An object of the other aspect of the present invention is to provide an electromagnetic wave detection method capable of easily measuring an electric field strength of an electromagnetic wave for each polarity.

A photoelectric conversion device according to an aspect of the present invention is provided with an electron emitter and a potential control unit. The electron emitter includes a meta-surface emitting an electron in response to incidence of an electromagnetic wave. The potential control unit controls electric potentials applied to the meta-surface. The meta-surface includes a plurality of patterns spaced away from each other. The plurality of patterns include an antenna portion and at least one bias portion. The antenna portion extends in a predetermined direction and emits the electron in response to incidence of the electromagnetic wave. The at least one bias portion faces the antenna portion. The potential control unit is configured to switch a first state and a second state by controlling electric potentials applied to the plurality of patterns. In the first state, a component of the electric field from the bias portion toward the antenna portion in a predetermined direction is positive. In the second state, a component of the electric field from the bias portion toward the antenna portion in a predetermined direction is negative.

In this photoelectric conversion device, the electric field from the bias portion toward the antenna portion is controlled by controlling the electric potentials by means of the potential control unit. When the electromagnetic wave to be measured enters the meta-surface, the electron is emitted from the antenna portion due to influence of the electric field from the bias portion toward the antenna portion. In the first state, the component of the electric field from the bias portion toward the antenna portion in a predetermined direction is positive. As a result, when the electromagnetic wave enters the meta-surface in the first state, the electron is emitted from the antenna portion according to the positive component of the electric field strength of the entered electromagnetic wave in a predetermined direction. In the second state, the component of the electric field from the bias portion toward the antenna portion in the predetermined direction is negative. As a result, when the electromagnetic wave enters the meta-surface in the second state, the electron is emitted from the antenna portion according on the negative component of the electric field of the entered electromagnetic wave in the predetermined direction. Therefore, the photoelectric conversion device is capable of achieving measurement of the electric field strength of the electromagnetic wave entering the meta-surface for each polarity by detecting the electron emitted from the meta-surface in each of the first state and the second state, with a simple configuration.

In the aspect mentioned above, the antenna portion may include first and second leading ends disposed at mutually different positions in a predetermined direction. The bias portion may include a first bias portion and a second bias portion. The first bias portion may face the first leading end. The second bias portion may face the second leading end. In a first state, a component of an electric field from the first leading end toward the first bias portion in a predetermined direction may be positive, and a component of an electric field from the second bias portion toward the second leading end in a predetermined direction may be positive. In the second state, a component of an electric field from the first bias portion toward the first leading end in a predetermined direction may be negative and a component of an electric field from the second leading end toward the second bias portion in a predetermined direction may be negative. In this case, the electron is emitted from the second leading end according to the positive component of the electric field strength of the entered electromagnetic wave in the predetermined direction, and the electron is emitted from the first leading end according to the negative component of the electric field strength of the entered electromagnetic wave in the predetermined direction. When the electromagnetic wave enters the meta-surface in the first state, the electron is emitted from the second leading end according to the positive component of the electric field strength of the entered electromagnetic wave in the predetermined direction. In the first state, the emission of electron from the first leading end is suppressed. When the electromagnetic wave enters the meta-surface in the second state, the electron is emitted from the first leading end according to the negative component of the electric field strength of the entered electromagnetic wave in the predetermined direction. In the second state, the emission of electron from the second leading end is suppressed.

In the aspect mentioned above, the antenna portion may include first and second leading ends disposed at mutually different positions in a predetermined direction. The bias portion may include a first bias portion facing the first leading end, and a second bias portion facing the second leading end. The first and second leading ends and the first and second bias portions may be disposed in the order of the second bias portion, the second leading end, the first leading end and the first bias portion in a predetermined direction. In the first state, an electric potential applied to the first bias portion may be lower than an electric potential applied to the antenna portion, and an electric potential applied to the second bias portion may be higher than the electric potential applied to the antenna portion. In the second state, the electric potential applied to the first bias portion may be higher than the electric potential applied to the antenna portion, and the electric potential applied to the second bias portion may be lower than the electric potential applied to the antenna portion. In this case, the electron is emitted from the second leading end according to the positive component of the electric field strength of the entered electromagnetic wave in the predetermined direction, and the electron is emitted from the first leading end according to the negative component of the electric field strength of the entered electromagnetic wave in the predetermined direction. When the electromagnetic wave enters the meta-surface in the first state, the electron is emitted from the second leading end based on an electric field caused by an electric potential difference between the second bias portion and the second leading end. In the first state, the emission of electron from the first leading end is suppressed by an electric field caused by an electric potential difference between the first bias portion and the first leading end. When the electromagnetic wave enters the meta-surface in the second state, the electron is emitted from the first leading end based on the electric field caused by the electric potential difference between the first bias portion and the first leading end. In the second state, the emission of electron from the second leading end is suppressed by the electric field caused by the electric potential difference between the second bias portion and the second leading end.

In the aspect mentioned above, the plurality of patterns may include a first linear part and a second linear part which are spaced away from each other. The first and second linear parts may extend in a predetermined direction and face each other in the predetermined direction. In a first state, the first linear part may configure the antenna portion and the second linear part may configure the bias portion. In a second state, the first linear part may configure the bias portion and the second linear part may configure the antenna portion. The photoelectric conversion device is capable of achieving measurement of the electric field strength of the electromagnetic wave for each polarity with a further simple configuration.

In the aspect mentioned above, the photoelectric conversion device may be further provided with a housing configured to be airtightly sealed and have a window unit transmitting an electromagnetic wave. The electron emitter may be disposed in the housing. In this case, an amount of emission of the electron in response to incidence of the electromagnetic wave can be improved by making the housing vacuum or filling the housing with gas.

An electromagnetic wave detection device according to the other aspect of the present invention is provided with the photoelectric conversion device mentioned above, a detection unit and a computing unit. The detection unit is configured to detect an electron emitted from the electron emitter. The computing unit is configured to compute information relating to a positive component of an electric field strength of an electromagnetic wave in a predetermined direction, based on a result of detection of the detection unit in a first state. The computing unit is configured to compute information relating to a negative component of an electric field strength of an electromagnetic wave in a predetermined direction, based on a result of detection of the detection unit in a second state. In this case, the electromagnetic wave detection device is capable of measuring the electric field strength of the electromagnetic wave for each polarity with a simple configuration.

A photoelectric conversion method according to further the other aspect of the present invention is provided with a first electron emission step and a second electron emission step. In the first and second electron emission steps, a meta-surface is used. The meta-surface includes a plurality of patterns including an antenna portion extending in a predetermined direction and at least one bias portion facing the antenna portion. In the first electron emission step, in a first state, an electron is emitted from the antenna portion in response to incidence of an electromagnetic wave to be measured on the meta-surface. The first state is a state where an electric potential is applied to the meta-surface in such a manner that a component of an electric field from the bias portion toward the antenna portion in the predetermined direction is positive. In the second electron emission step, in a second state, an electron is emitted from the antenna portion in response to incident of an electromagnetic wave to be measured on the meta-surface. The second state is a state where the electric potential is applied to the meta-surface in such a manner that the component of the electric field from the bias portion toward the antenna portion in the predetermined direction is negative.

In the photoelectric conversion method, when the electromagnetic wave of the object to be measure enters the meta-surface, the electron is emitted from the antenna portion due to an influence of the electric field in each of the first state and the second state. In the first state, a component of the electric field from the bias portion toward the antenna portion in a predetermined direction is positive. As a result, when the electromagnetic wave enters the meta-surface in the first state, the electron according to the positive component of the electric field strength of the entered electromagnetic wave in the predetermined direction is emitted from the antenna portion. In the second state, a component of the electric field from the bias portion toward the antenna portion in a predetermined direction is negative. As a result, when the electromagnetic wave enters the meta-surface in the second state, the electron according to the negative component of the electric field strength of the entered electromagnetic wave in the predetermined direction is emitted from the antenna portion. Therefore, the measurement of the electric field strength of the electromagnetic wave entering the meta-surface for each polarity can be achieved easily by detecting the electron emitted from the meta-surface in each of the first state and the second state.

In the other aspect mentioned above, the antenna portion may include first and second leading ends disposed at mutually different positions in a predetermined direction. The bias portion may include a first bias portion and a second bias portion. The first bias portion may face the first leading end. The second bias portion may face the second leading end. In a first electron emission step, an electric potential is applied to the meta-surface in such a manner that a component of an electric field from the first leading end toward the first bias portion in the predetermined direction is positive, and a component of an electric field from the second bias portion toward the second leading end in the predetermined direction is positive. In a second electron emission step, an electric potential is applied to the meta-surface in such a manner that a component of an electric field from the first bias portion toward the first leading end in the predetermined direction is negative, and a component of an electric field from the second leading end toward the second bias portion in the predetermined direction is negative. In this case, the electron according to the positive component of the electric field strength of the entered electromagnetic wave in the predetermined direction is emitted from the second leading end, and the electron according to the negative component of the electric field strength of the entered electromagnetic wave in the predetermined direction is emitted from the first leading end. When the electromagnetic wave enters the meta-surface in the first state, the electron according to the positive component of the electric field strength of the entered electromagnetic wave is emitted from the second leading end. In the first state, the emission of electron from the first leading end is suppressed. When the electromagnetic wave enters the meta-surface in the second state, the electron according to the negative component of the electric field strength of the entered electromagnetic wave in the predetermined direction is emitted from the first leading end. In the second state, the emission of electron from the second leading end is suppressed.

In the other aspect mentioned above, the antenna portion may include first and second leading ends disposed at mutually different positions in a predetermined direction. The bias portion may include a first bias portion and a second bias portion. The first bias portion may face the first leading end. The second bias portion may face the second leading end. The first and second leading ends and the first and second bias portions may be disposed in the order of the second bias portion, the second leading end, the first leading end and the first bias portion in the predetermined direction. In a first electron emission step, an electric potential applied to the first bias portion may be lower than an electric potential applied to the antenna portion, and an electric potential applied to the second bias portion may be higher than the electric potential applied to the antenna portion. In a second electron emission step, the electric potential applied to the first bias portion may be higher than the electric potential applied to the antenna portion, and the electric potential applied to the second bias portion may be lower than the electric potential applied to the antenna portion. In this case, the electron is emitted from the second leading end according to the positive component of the electric field strength of the entered electromagnetic wave in the predetermined direction, and the electron is emitted from the first leading end according to the negative component of the electric field strength of the entered electromagnetic wave in the predetermined direction. When the electromagnetic wave enters the meta-surface in the first state, the electron is emitted from the second leading end according to the positive component of the electric field strength of the entered electromagnetic wave. In the first state, the emission of electron from the first leading end is suppressed. When the electromagnetic wave enters the meta-surface in the second state, the electron is emitted from the first leading end according to the negative component of the electric field strength of the entered electromagnetic wave in the predetermined direction. In the second state, the emission of electron from the second leading end is suppressed.

In the other aspect mentioned above, the plurality of patterns may include a first linear part and a second linear part which are spaced away from each other. The first and second linear parts may extend in a predetermined direction and face each other in the predetermined direction. In a first electron emission step, the first linear part may configure an antenna portion, and the second linear part may configure a bias portion. In a second electron emission step, the first linear part may configure the bias portion and the second linear part may configure the antenna portion. The photoelectric conversion method is capable of easily achieving measurement of the electric field strength of the electromagnetic wave for each polarity.

An electromagnetic wave detection method according to further the other aspect of the present invention is provided with the photoelectric conversion method mentioned above. The electromagnetic wave detection method is further provided with a first detection step, a second detection step, a first computing step and a second computing step. In the first detection step, an electron emitted from an electron emitter in a first electron emission step is detected. In the second detection step, an electron emitted from the electron emitter in a second electron emission step is detected. In the first computing step, information relating to a positive component of an electric field strength of an electromagnetic wave in the predetermined direction is computed based on a result of detection in the first detection step in the first state. In the second computing step, information relating to a negative component of the electric field strength of the electromagnetic wave in the predetermined direction is computed based on a result of detection in the second detection step in the second state. In this case, the electromagnetic wave detection method is capable of easily measuring the electric field strength of the electromagnetic wave for each polarity.

According to one aspect of the present invention, it is possible to provide the photoelectric conversion device capable of achieving the measurement of electric field strength of the electromagnetic wave for each polarity with the simple configuration. According to the other aspect of the present invention, it is possible to provide the electromagnetic wave detection device capable of measuring the electric field strength of the electromagnetic wave for each polarity with the simple configuration. According to further the other aspect of the present invention, it is possible to provide the photoelectric conversion method capable of easily achieving the measurement of the electric field strength of the electromagnetic wave for each polarity. According to the other aspect of the present invention, it is possible to provide the electromagnetic wave detection method capable of easily measuring the electric field strength of the electromagnetic wave for each polarity.

DETAILED DESCRIPTION

Figure 1:
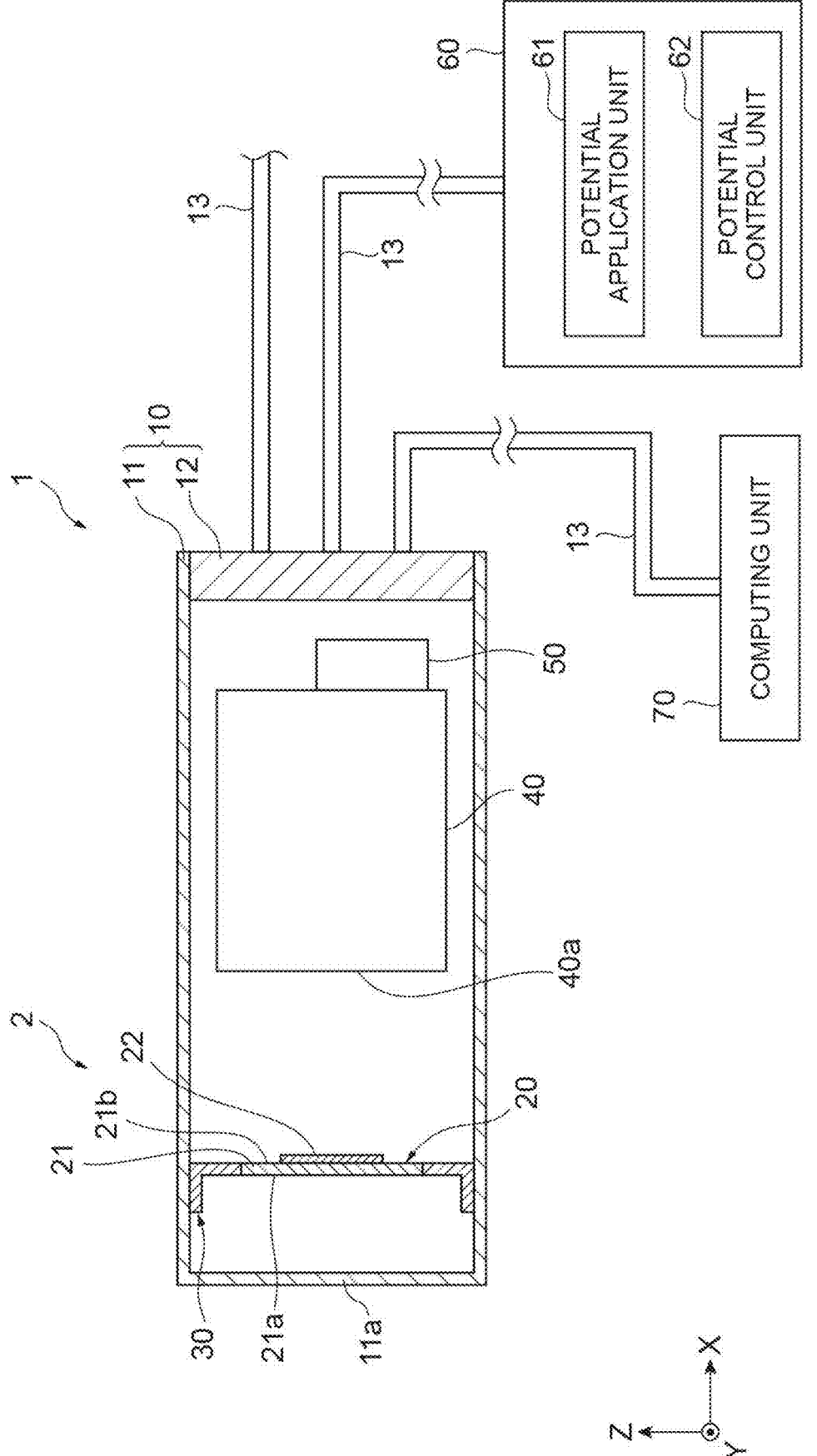
FIG. 1 is a perspective view of an electromagnetic wave detection device according to the present embodiment.

Hereinafter, an embodiment of the present invention will be described in detail with reference to the accompanying drawings. In the following description, the same elements or corresponding elements will be denoted with the same reference numerals and a redundant explanation will be omitted.

First, a configuration of an electromagnetic wave detection device according to the present embodiment will be described with reference to FIG. 1. FIG. 1 is a perspective view of the electromagnetic wave detection device according to the present embodiment.

An electromagnetic wave detection device 1 detects an entered electromagnetic wave. The electromagnetic wave detection device 1 includes a photoelectric conversion device 2. The photoelectric conversion device 2 emits an electron in response to incidence of the electromagnetic wave. In the present specification, the term "light" includes the other electromagnetic waves than a visible light. In the present embodiment, the electromagnetic wave detection device 1 detects the entered electromagnetic wave based on the electron emitted from the photoelectric conversion device 2 in response to incidence of the electromagnetic wave. The photoelectric conversion device 2 emits the electron, for example, in response to the incidence of the electromagnetic wave having a range of wavelength between a so-called millimeter wave and an infrared light. The range of wavelength between the millimeter wave and the infrared light corresponds, for example, to a frequency range between about 0.01 and 150 THz. In the present specification, the term "range of wavelength" may include a range of a plurality of wavelength regions separated from each other, or may be a range of one continuous wavelength region. The photoelectric conversion device 2 emits the electron, for example, according to an electron field emission (field emission).

The electromagnetic wave detection device 1 is, for example, an electron tube which outputs an electric signal in response to incidence of an electromagnetic wave. For example, the electromagnetic wave detection device 1 emits an electron in response to incidence of the electromagnetic wave, detects the emitted electron and outputs an electric signal based of the result of detection, in an inner portion of the electron tube. The electron tube is, for example, a photomultiplier tube (PMT). The electromagnetic wave detection device 1 emits the electron in the inner portion when the electromagnetic wave enters, and multiplies the emitted electron. According to a modification of the present embodiment, the electromagnetic wave detection device 1 may not be provided with a configuration for detecting the electron in the electron tube. In other words, the electromagnetic wave detection device 1 may be provided with an electron tube emitting the electron to an outer portion in response to incidence of the electromagnetic wave as the photoelectric conversion device 2, and may be provided with a detection unit detecting the electron emitted from the electron tube in an outer portion of the electron tube.

The electromagnetic wave detection device 1 is provided with a housing 10, an electron emitter 20, a holder 30, an electron multiplying unit 40, an electron collecting unit 50, a power supply unit 60, and a computing unit 70. The electron emitter 20, the holder 30, the electron multiplying unit 40 and the electron collecting unit 50 are disposed in the housing 10. The photoelectric conversion device 2 is provided with the housing 10, the electron emitter 20 and the power supply unit 60, and configures a part of the electromagnetic wave detection device 1.

The housing 10 has a valve 11 and a stem 12. The inner portion of the housing 10 is airtightly sealed by the valve 11 and the stem 12. In the present embodiment, the inner portion of the housing 10 is held in a vacuum. The vacuum in the housing 10 may not be an absolute vacuum, but may be a state where the housing is filled with gas having a lower pressure than an atmospheric pressure. For example, the inner portion of the housing 10 is held at $1 \times 10^{-4}$ to $1 \times 10^{-7}$ Pa.

The valve 11 includes a window unit 11a having an electromagnetic wave transparency. In the present specification, the term "electromagnetic wave transparency" means a property of transmitting at least a partial frequency range of wavelength of the range of wavelength of the entered electromagnetic wave. In the present embodiment, the housing 10 has a circular cylindrical shape. The housing 10 extends in an X-axis direction as illustrated in FIG. 1. The stem 12 configures a bottom surface of the housing 10. The stem 12 configures, for example, one end surface of the housing 10 in the X-axis direction. The valve 11 configures a side surface of the housing 10 and a bottom surface facing the stem 12.

The window unit 11*a* configures a bottom surface facing the stem 12. For example, the window unit 11*a* is formed into a circular shape as viewed from the X-axis direction while setting a direction of YZ axis to a diametrical direction. A frequency characteristic of transmittance of the electromagnetic wave is different depending on a material. Therefore, the window unit 11*a* is configured by an appropriate material depending on a frequency range of the electromagnetic wave entering the housing 10. For example, the window unit 11*a* includes at least one selected from quartz, silicon, germanium, sapphire, zinc selenide, zinc sulfide, magnesium fluoride, lithium fluoride, barium fluoride, calcium fluoride, magnesium oxide, calcium carbonate, diamond and chalcogenide glass. Therefore, an electromagnetic wave having an arbitrary frequency range between millimeter wave and infrared light can be guided into the inner portion of the housing 10. For example, the quartz is suitable for a material of a member transmitting an electromagnetic wave having a frequency range of 0.1 to 5 THz, the silicon is suitable for a material of a member transmitting an electromagnetic wave having a frequency range of 0.04 to 11 THz and 46 THz or more, the magnesium fluoride is suitable for a material of a member transmitting an electromagnetic wave having a frequency range of 40 THz or more, the germanium is suitable for a material of a member transmitting an electromagnetic wave having a frequency range of 13 THz or more, and the zinc selenide is suitable for a material of a member transmitting an electromagnetic wave having a frequency range of 14 THz or more.

The housing 10 further has a plurality of wires 13 for enabling electrical connection between an outer portion and an inner portion of the housing 10. The plurality of wires 13 are, for example, lead wires or pins. In the present embodiment, the plurality of wires 13 are pins penetrating the stem 12 and extend from the inner portion of the housing 10 to the outer portion thereof. At least one of the plurality of wires 13 is connected to various members provided in the inner portion of the housing 10.

The electron emitter 20 emits the electron in response to incidence of the electromagnetic wave. The electron emitter 20 is provided with a supporting body 21. The supporting body 21 has, for example, a plate shape. The supporting body 21 is formed, for example, into a rectangular shape in plan view. The supporting body 21 has a principal surface 21*a* and a principal surface 21*b* facing each other. The principal surface 21*a* and the principal surface 21*b* are surfaces of the supporting body 21 which are positioned in opposite sides to each other. The principal surface 21*a* and the principal surface 21*b* are, for example, flat surfaces, and are formed into a rectangular shape in plan view. The principal surface 21*a* and the principal surface 21*b* are disposed in parallel to the window unit 11*a*. The principal surface 21*a* faces the window unit 11*a*. The electromagnetic wave passing through the window unit 11*a* enters the principal surface 21*a*.

The supporting body 21 has an electromagnetic wave transparency with respect to the electromagnetic wave passing through the window unit 11*a*. As a result, the supporting body 21 transmits at least partial frequency range of the electromagnetic wave passing through the window unit 11*a*. The supporting body 21 can be made of the same material as that of the window unit 11*a*. The material of the supporting body 21 includes, for example, silicon. In one photoelectric conversion device 2, the supporting body 21 and the window unit 11*a* may not be made of the same material. The supporting body 21 is spaced away from the window unit 11*a* and the electron multiplying unit 40. In the modification of the present invention, the supporting body 21 may be attached to the window unit 11*a* or the electron multiplying unit 40.

The electron emitter 20 has a meta-surface 22. The meta-surface 22 is provided in the supporting body 21. The meta-surface 22 emits the electron in response to incidence of the electromagnetic wave. For example, the meta-surface 22 has a sensitivity for the electromagnetic wave in a range of wavelength between the so-called millimeter wave and the infrared light. The meta-surface 22 also has a sensitivity for terahertz-wave. The range of wavelength of the terahertz-wave corresponds to a frequency range between 100 GHz and 30 THz. The term "having a sensitivity for an electromagnetic wave" means that an electron is emitted in response to incidence of the electromagnetic wave.

For example, the meta-surface 22 includes an oxide layer formed on the principal surface 21*b* of the supporting body 21, and a metal layer formed on the oxide layer. The material of the oxide layer includes, for example, silicon dioxide and titanium oxide. For example, the oxide layer includes a layer including the silicon dioxide, and a layer including the titanium oxide. The material of the metal layer includes, for example, gold. In the present embodiment, the oxide layer is formed on the principal surface 21*b* of the supporting body 21 made of quartz, and the metal layer is formed on the oxide layer. For example, a thickness of the supporting body 21 is 525 μm, a thickness of the layer including the silicon diode in the meta-surface 22 is 1 μm, a thickness of the layer including the titanium dioxide in the meta-surface 22 is 10 nm, and a thickness of the metal layer in the meta-surface 22 is 200 nm. The meta-surface 22 has a rectangular shape in plan view. In the modification of the present embodiment, the meta-surface 22 may be provided on the principal surface 21*a*.

The holder 30 holds the electron emitter 20 in the inner portion of the housing 10. The holder 30 is positioned to the inner surface 10*a* of the housing 10. The holder 30 positions the electron emitter 20 for the housing 10. The holder 30 has a frame shape along the inner surface 10*a* of the housing 10, and a penetration opening is formed in the holder 30. The meta-surface 22 of the electron emitter 20 is disposed in an inner side of an edge defining the penetration opening as seen from an orthogonal direction to the principal surfaces 21*a* and 21*b* of the electron emitter 20.

The electron multiplying unit 40 is disposed in the inner portion of the housing 10, and has an incidence surface 40*a* which the electron emitted from the electron emitter 20 enters. The electron multiplying unit 40 multiplies the electron entering the incidence surface 40*a*. In the present embodiment, the principal surface 21*b* of the electron emitter 20 faces the incidence surface 40*a* of the electron multiplying unit 40. The meta-surface 22 faces the incidence surface 40*a* of the electron multiplying unit 40, and the electron emitted from the meta-surface 22 enters the incidence surface 40*a*. The principal surface 21*a* of the electron emitter 20 faces the window unit 11*a* of the housing 10. The electron multiplying unit 40 has, for example, multistage dynodes.

The electron collecting unit 50 is disposed in the inner portion of the housing 10, and collects the electron which is multiplied by the electron multiplying unit 40. The electron collecting unit 50 is a detection unit detecting the electron emitted from the electron emitter 20. The electromagnetic wave detection device 1 detects the electromagnetic wave by detecting the electron in the electron collecting unit 50. In the present embodiment, for example, the electron collecting unit 50 has an anode to which one of a plurality of wires 13 is connected. A predetermined electric potential is applied to the anode through the wire 13. The anode catches the electron which is multiplied by the dynodes of the electron multiplying unit 40. The electron collecting unit 50 may have a diode in place of the anode.

In the present embodiment, the meta-surface 22 is of an active type and is operated by application of bias voltage. The meta-surface 22 is operated by application of electric potentials by means of the power supply unit 60. The power supply unit 60 is electrically connected to the meta-surface 22. The power supply unit 60 includes a potential application unit 61 and a potential control unit 62. The potential application unit 61 applies the electric potential to the meta-surface 22. The potential control unit 62 controls the potential application unit 61. The electric potentials applied to the meta-surface 22 are controlled by the potential control unit 62. The meta-surface 22 is operated in response to the electric potential controlled by the potential control unit 62. In other words, the meta-surface 22 emits the electron in response to the control of electric potential by the potential control unit 62.

The computing unit 70 acquires a result of detection in the electron collecting unit 50, and computes an electric field strength of an electromagnetic wave based on the result of detection. For example, the computing unit 70 acquires an electric signal based on the electron collected in the electron collecting unit 50 as the result of detection. The computing unit 70 outputs information relating to the computed electric field strength. For example, the computing unit 70 displays the information relating to the computed electric field strength on a display unit which is not illustrated.

The potential control unit 62 and the computing unit 70 are one computer or a plurality of computers, for example, constructed by a hardware and a software such as programs. The potential control unit 62 and the computing unit 70 are provided, for example, with a processor, a main storage unit, an auxiliary storage unit, a communication device and an input device, as the hardware. The processor executes an operating system and an application program. The main storage is constructed by Read Only Memory (ROM) and Random Access Memory (RAM). The auxiliary storage unit is a storage medium which is constructed by a hard disc and a flash memory. The auxiliary storage unit generally stores a larger amount of data than the main storage unit. The communication device is constructed by a network card or a wireless communication module. The input device is constructed by a keyboard, a mouse and a touch panel. The potential control unit 62 and the computing unit 70 may be integrally configured or may be separated.

Configuration of Photoelectric Conversion Device

Figure 2:
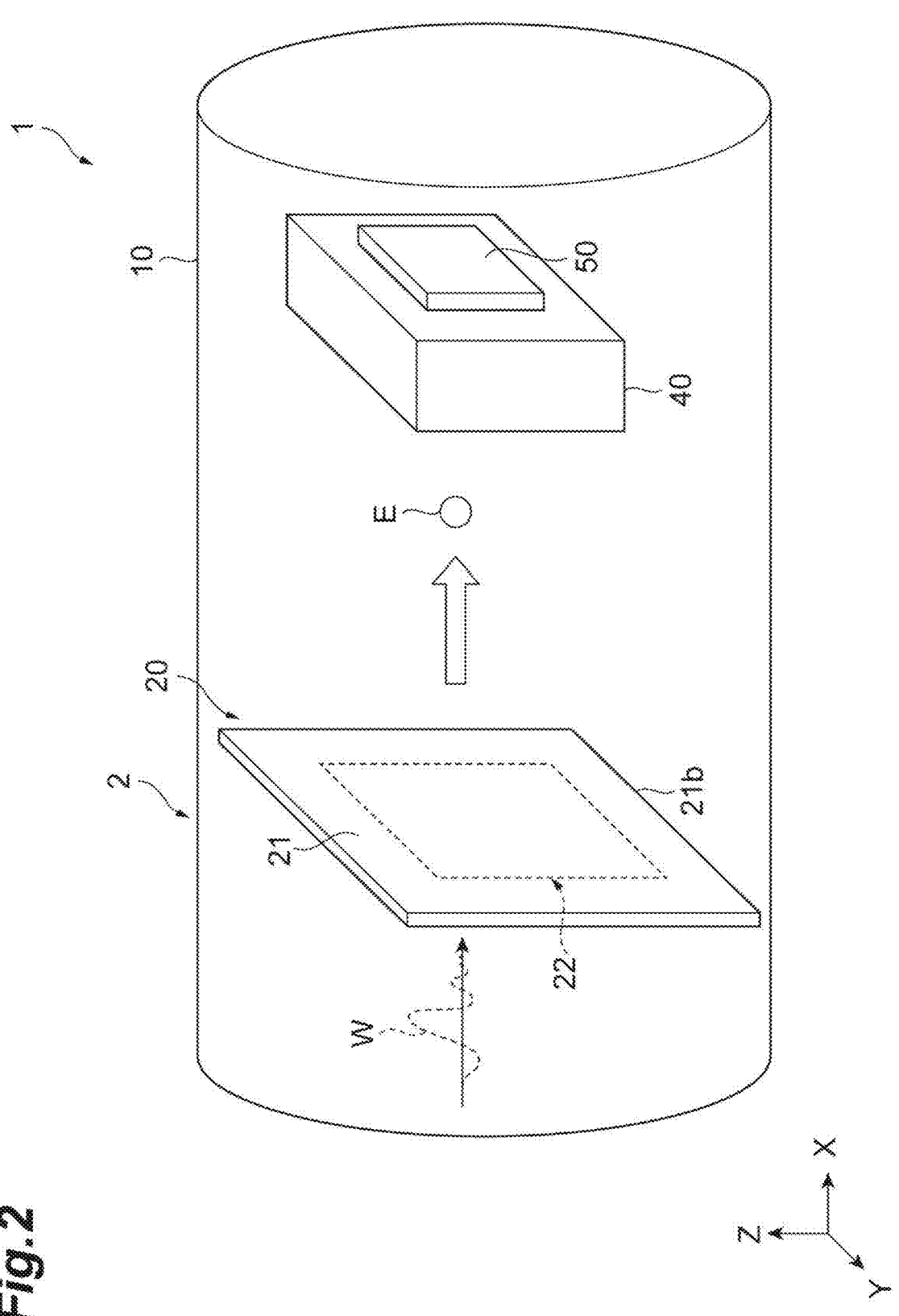
FIG. 2 is a schematic view of a photoelectric conversion device.
Figure 3:
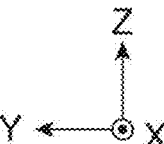
FIG. 3 is a schematic view of the photoelectric conversion device.

Next, the photoelectric conversion device 2 will be described further in detail with reference to FIGS. 2 and 3. FIG. 2 is a schematic view of the photoelectric conversion device. FIG. 3 is a schematic view for describing application of electric potential in the photoelectric conversion device.

In the example illustrated in FIG. 2, an electromagnetic wave W entering the housing 10 enters the meta-surface 22, and the meta-surface 22 emits an electron E in response to incidence of the electromagnetic wave W. An electric field strength of the electromagnetic wave W includes a positive component in a Z-axis direction and a negative component in a Z-axis direction. The electron E emitted from the meta-surface 22 enters the electron multiplying unit 40. The electron multiplied in the electron multiplying unit 40 is collected in the electron collecting unit 50.

As illustrated in FIG. 3, the meta-surface 22 includes at least one photoelectric conversion unit 25. The photoelectric conversion unit 25 emits the electron E in response to incidence of the electromagnetic wave W having a corresponding wavelength and a corresponding directional component of the electric field. For example, the photoelectric conversion unit 25 has a sensitivity for a frequency range around a center frequency of 1.5 THz. For example, the photoelectric conversion unit 25 has a sensitivity for a Z-axis direction component of the electric field of the electromagnetic wave W. A state where the photoelectric conversion unit 25 has a sensitivity for the positive component in the Z-axis direction and a state where the photoelectric conversion unit 25 has a sensitivity for the negative component in the Z-axis direction the photoelectric conversion unit 25 are switched according to the electric potential control by the potential control unit 62. The frequency range and the directional component of the electric field for which the photoelectric conversion unit 25 has the sensitivity are not limited to the above.

As illustrated in FIG. 3, the meta-surface 22 includes a plurality of patterns 31, 32 and 33 which are spaced away from each other. The frequency range and the directional component of the electric field for which the photoelectric conversion unit 25 has the sensitivity depends on the configurations of the plurality of patterns 31, 32 and 33. The term "configuration" includes various attributes such as a shape and a material. The term "shape" also includes a size. The plurality of patterns 31, 32 and 33 include an antenna portion P1 and a bias portion P2. The smaller the size of the antenna portion P1 is, the more the field electron emission tends to be generated for the electromagnetic wave having short wavelength, that is, the electromagnetic wave having a great frequency.

The antenna portion P1 emits the electron E in response to incidence of the electromagnetic wave W. The bias portion P2 generates an electric field between the bias portion and the corresponding antenna portion P1 when the bias potential is applied. When a higher electric potential than the antenna portion P1 is applied to the bias portion P2, an electric potential barrier in the leading end portion of the bias portion P2 side in the antenna portion P1 becomes thin. When a lower electric potential than the antenna portion P1 is applied to the bias portion P2, the electric potential barrier in the leading end portion of the bias portion P2 side in the antenna portion P1 becomes thick. A state where a higher electric potential than the antenna portion P1 is applied to the bias portion P2 is called as "forward bias". A state where a lower electric potential than the antenna portion P1 is applied to the bias portion P2 is called as "reverse bias".

When the electromagnetic wave W enters the antenna portion P1, the electric field is induced around the antenna portion P1. The electric potential barrier at the antenna-vacuum interface becomes thin by the electric field induced around the antenna portion P1. In a case where the electric potential barrier becomes further thin by the incidence of the electromagnetic wave W on the antenna portion P1 in the forward bias state, the electron existing in the antenna portion P1 can slip out of the electric potential barrier due to a tunnel effect. The electron slipping out of the electric potential barrier is accelerated by the electric field around the antenna portion P1. As mentioned above, a field electron emission can be generated by the incidence of the electromagnetic wave W on the antenna portion P1 in the forward bias state.

Each of the patterns 31, 32 and 33 is disposed on the principal surface 21b of the supporting body 21. The plurality of patterns 31, 32 and 33 are connected via the oxide layer. The plurality of patterns 31, 32 and 33 are separated from each other by the oxide layer, and are insulated from each other at least when the photoelectric conversion device 2 is not operated. Each of the patterns 31, 32 and 33 is a conductive line, and conducts the electron. Each of the patterns 31, 32 and 33 includes a metal layer which is formed at least on the oxide layer of the meta-surface 22. A material of the metal layer includes, for example, gold.

In the example illustrated in FIG. 3, the pattern 31 includes a linear part 41 extending in a Y-axis direction. The linear part 41 is formed, for example, into a linear shape. The pattern 31 includes a plurality of linear parts 42 each extending in a Z-axis direction. The plurality of linear parts 42 are spaced away from each other. Each of the linear parts 42 is formed, for example, into a linear shape. Each of the linear parts 42 is connected to the linear part 41 in one end thereof. The pattern 31 includes a plurality of linear parts 43 which are connected to the other ends of the corresponding linear parts 42. Each of the linear parts 43 extends in a Y-axis direction. The plurality of linear parts 43 are positioned on the same line extending in the Y-axis direction. The term "other end" is a portion which is positioned in an opposite side to one end. The plurality of linear parts 43 are spaced away from each other.

Each of the linear parts 43 includes a leading end 34 and a leading end 35. The leading end 34 and the leading end 35 are portions which are most away from each other in the Y-axis direction in each of the linear parts 43. Each of the linear parts 42 is connected to the corresponding linear part 43 at the middle between the leading end 34 and the leading end 35. The leading end 34 and the leading end 35 of the linear parts 43 adjacent to each other face each other. Each of the linear parts 45 extends in +Z-axis direction. The plurality of linear parts 45 are positioned on the same line extending in the Y-axis direction.

The pattern 32 includes a linear part 44 extending in a Y-axis direction. The linear part 44 is formed, for example, into a linear shape. The pattern 32 includes a plurality of linear parts 45 each extending in a +Z-axis direction. The plurality of linear parts 45 are spaced away from each other. Each of the linear parts 45 is formed, for example, into a linear shape. Each of the linear parts 45 is connected to the linear part 44 in one end thereof. The pattern 32 includes a plurality of linear parts 46 which are connected to the other ends of the corresponding linear parts 45. Each of the linear parts 46 extends in a Y-axis direction. The plurality of linear parts 46 are positioned on the same line extending in a Y-axis direction. The plurality of linear parts 46 are spaced away from each other.

Each of the linear parts 46 includes a leading end 36 and a leading end 37. The leading end 36 and the leading end 37 are portions which are most away from each other in the Y-axis direction in each of the linear parts 46. Each of the linear parts 45 is connected to the corresponding linear part 46 at the middle between the leading end 36 and the leading end 37. The leading end 36 and the leading end 37 of the linear parts 46 adjacent to each other face each other. The pattern 32 has a configuration which is line symmetrical with the pattern 31.

The pattern 33 extends toward the patterns 31 and 32. The pattern 33 includes a leading end 38 facing the pattern 31. The pattern 33 includes a leading end 39 facing the pattern 33. For example, in a case where the leading end 38 is a first leading end, the leading end 39 is a second leading end. In the present embodiment, the pattern 33 emits the electron E in response to incidence of the electromagnetic wave W in a state where a lower electric potential than the pattern 31 or the pattern 32 is applied to the pattern 33.

The pattern 33 includes a linear part 47 extending in a Y-axis direction. The linear part 47 is formed, for example, into a linear shape. For example, the linear part 47 is in parallel to the linear part 41 and the linear part 44. The pattern 33 includes a plurality of linear parts 48 each extending in a Z-axis direction. The plurality of linear parts 48 are spaced away from each other. For example, the plurality of linear parts 48 are in parallel to each other. Each of the linear parts 48 extends in a +Z-axis direction and a −Z-axis direction from a portion connected to the linear part 47. Each of the linear parts 48 is connected to the linear part 47 at the center thereof. For example, each of the linear parts 48 is formed into a linear shape. Each of the linear parts 48 includes a pair of linear parts 48a and 48b. The linear part 48a extends in the +Z-axis direction from a portion connected to the linear part 47. The linear part 48b extends in the −Z-axis direction from a portion connected to the linear part 47. A pair of linear parts 48a and 48b in each of the linear parts 48 extend on the same line in the Z-axis direction. Each of the linear parts 48 is disposed between the pattern 31 and the pattern 32 in the Z-axis direction. In other words, each of the linear parts 48 is disposed between the linear part 43 and the linear part 46 in the Z-axis direction.

Each of the linear parts 48 includes the leading end 38 and the leading end 39 mentioned above. The leading end 38 and the leading end 39 are disposed at mutually different positions in the Z-axis direction. The leading ends 38 and 39 are positioned at both ends of each of the linear parts 48. Each of the linear parts 48 is connected to the linear part 47 between the leading end 38 and the leading end 39. The leading end 38 is included in the linear part 48a. The leading end 39 is included in the linear part 48b. The leading end 38 and the leading end 39 included in the same linear part 48 are disposed on the same line in the Z-axis direction.

The leading end 38 of the pattern 33 is a portion which is the closest to the pattern 31 in the linear part 48 including the leading end 38. The leading end 38 is disposed closer to the corresponding linear part 43 than the other portions of the pattern 33. The leading end 38 faces the leading end 34 and the leading end 35 of the pattern 31. In the Z-axis direction, the leading ends 38 and 39 of each of the linear parts 48 are positioned between the leading end 34 and the leading end 35 facing each other. The shortest distance between the leading end 38 and the leading end 34 is equal to the shortest distance between the leading end 38 and the leading end 35. In the leading end 34, the leading end 35 and the leading end 38 facing each other, a distance between the leading end 38 and the leading end 34 in the Y-axis direction is equal to a distance between the leading end 38 and the leading end 35 in the Y-axis direction. In the leading end 34, the leading end 35 and the leading end 38 facing each other, a distance between the leading end 38 and the leading end 34 in the Z-axis direction is equal to a distance between the leading end 38 and the leading end 35 in the Z-axis direction. The leading end 34 and the leading end 35 facing the same leading end 38 are included in the mutually different linear parts 43.

The leading end 39 of the pattern 33 is the closest portion to the pattern 32 in the linear part 48 including the leading end 39. The leading end 39 is disposed closer to the corresponding to the linear part 46 than the other portions of the pattern 33. The leading end 39 faces the leading end 36 and the leading end 37 of the pattern 32. In the Z-axis direction, the leading ends 38 and 39 of each of the linear parts 48 are positioned between the leading end 36 and the leading end 37 facing each other. The shortest distance between the leading end 39 and the leading end 36 is equal to the shortest distance between the leading end 39 and the leading end 37. In the leading end 36, the leading end 37 and the leading end 39 facing each other, a distance between the leading end 39 and the leading end 36 in the Y-axis direction is equal to a distance between the leading end 39 and the leading end 37 in the Y-axis direction. In the leading end 36, the leading end 37 and the leading end 39 facing each other, a distance between the leading end 39 and the leading end 36 in the Z-axis direction is equal to a distance between the leading end 39 and the leading end 37 in the Z-axis direction. The leading end 36 and the leading end 37 facing the same leading end 39 are included in the mutually different linear parts 46. Each of the linear parts 48 extends along a line connecting a middle point between the leading end 34 and the leading end 35 facing the leading end 38 of the linear part 48 to a middle point between the leading end 36 and the leading end 37 facing the leading end 39 of the linear part 48.

In the photoelectric conversion unit 25, each of the linear part 43 and the linear part 46 configures a bias portion P2, and the linear part 48 configures an antenna portion P1. The antenna portion P1 extends in the Z-axis direction, and each of two bias portions P2 faces the antenna portion P1. The leading end 38 and the leading end 39, and two bias portions P2 are disposed in the order of the bias portion P2 configured by the linear part 46, the leading end 39, the leading end 38, and the bias portion P2 configured by the linear part 43 in the Z-axis direction. In the photoelectric conversion unit 25, each of the linear parts 48 can emit the electron E in response to incidence of the electromagnetic wave W in a state where a lower electric potential than the linear part 43 or the linear part 46 is applied thereto. For example, in a case where the bias portion P2 configured by the linear part 43 is the first bias portion, the bias portion P2 configured by the linear part 46 is the second bias portion.

The photoelectric conversion unit 25 is configured to correspond to a range of wavelength, for example, from a millimeter wave to an infrared light by a change of a configuration of the linear part 48. For example, a length of the linear part 48 in the Z-axis direction corresponds to a wavelength region of the electromagnetic wave W which allows the electron E to be emitted in the photoelectric conversion unit 25. For example, the length of the linear part 48 in the Z-axis direction is designed according to a desired wavelength region emitting the electron E from the photoelectric conversion unit 25. For example, each of the linear parts 48 has a length which is half the length of a center wavelength in the desired wavelength region. The length of each of the linear parts 48 is a length from the leading end 38 to the leading end 39 in the Z-axis direction. In a case where the electromagnetic wave having transmitted the supporting body 21 enters the linear part 48 as the present embodiment, a refractive index of the supporting body 21 through which the electromagnetic wave has passed is also taken into consideration. For example, in a case where a wavelength of the electromagnetic wave entering the electron tube is 600 μm, and a refractive index of the supporting body 21 is 3.4 for the electromagnetic wave, a wavelength of the electromagnetic wave entering the linear part 48 is 600 μm/3.4=176 μm. Therefore, in this case, for example, as the length of the linear part 48 in the Z-axis direction, 176 μm/2=88 μm may be appropriate.

The electron emitter 20 is further provided with a plurality of electrodes 51, 52 and 53 which are spaced away from each other, as illustrated in FIG. 3. The plurality of electrodes 51, 52 and 53 are provided on the principal surface 21b of the supporting body 21. The plurality of electrodes 51, 52 and 53 are electrically connected to the photoelectric conversion unit 25. In the present embodiment, each of electrodes 51, 52 and 53 is formed into a rectangular shape. As a modification of the present embodiment, each of the electrodes 51, 52 and 53 may be formed into a linear shape in the same manner as the linear part 41, the linear part 44 or the linear part 47. Each of the electrodes 51, 52 and 53 may be integrally formed with the linear part 41, the linear part 44 or the linear part 47.

For example, the electrode 51 is electrically connected to the linear part 47 of the photoelectric conversion unit 25. The electrode 52 is electrically connected to the linear part 41 of the photoelectric conversion unit 25. The electrode 53 is electrically connected to the linear part 44 of the photoelectric conversion unit 25. The photoelectric conversion unit 25 is operated by application of electric potentials from the power supply unit 60 via the plurality of electrodes 51, 52 and 53. The potential application unit 61 of the power supply unit 60 applies the electric potential to the photoelectric conversion unit 25 via the plurality of electrodes 51, 52 and 53. The potential control unit 62 of the power supply unit 60 controls the electric potential applied to the photoelectric conversion unit 25.

As illustrated in FIG. 3, the potential application unit 61 includes, for example, a first potential application unit 61a and a second potential application unit 61b. The first potential application unit 61a gives an electric potential difference to a portion between the electrode 51 and the electrode 52. The second potential application unit 61b gives an electric potential difference to a portion between the electrode 51 and the electrode 53. The potential control unit 62 controls each of the first potential application unit 61a and the second potential application unit 61b.

Figure 4A:
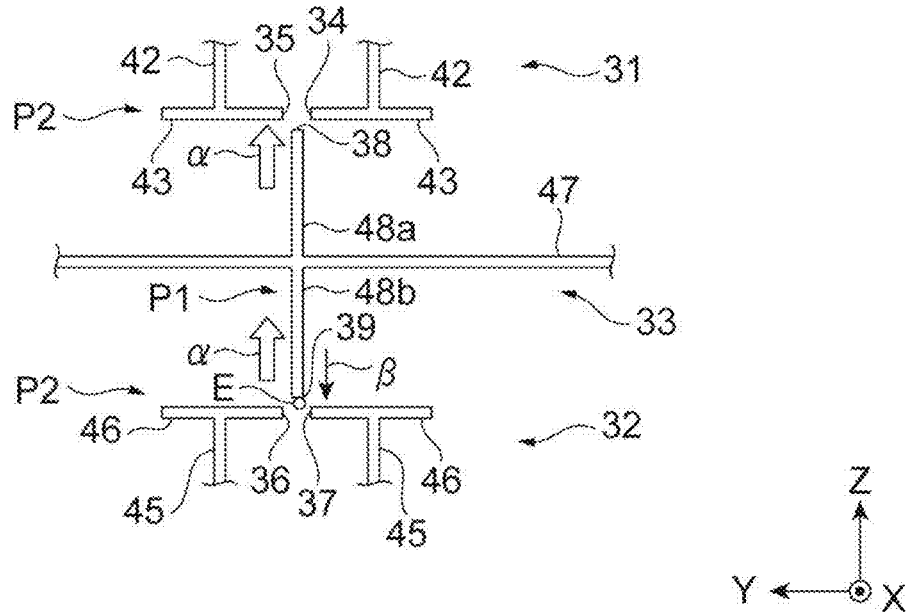
FIG. 4A is a view for describing an operation of the photoelectric conversion device.
Figure 4B:
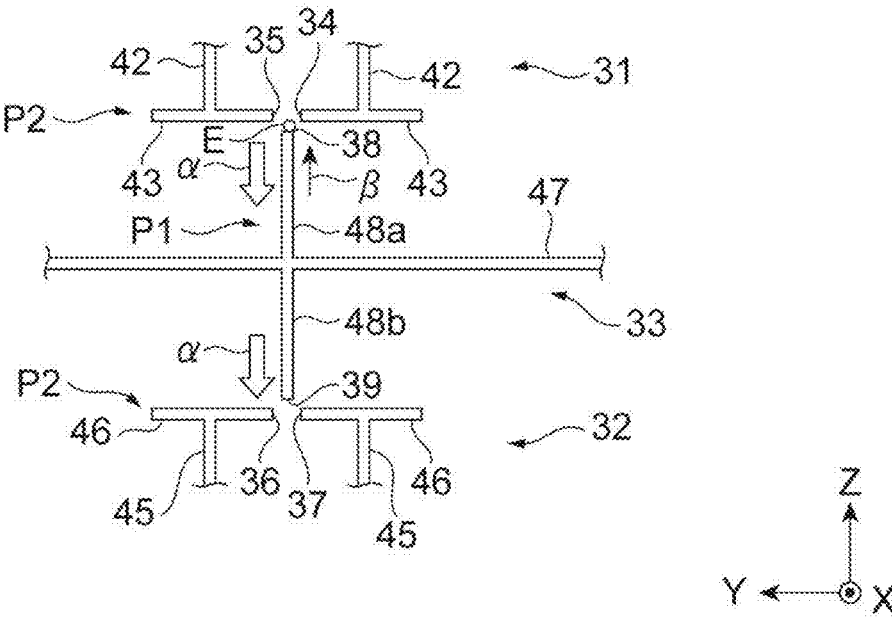
FIG. 4B is a view for describing an operation of the photoelectric conversion device.

Next, an operation of the photoelectric conversion device 2 according to the present embodiment will be described in detail with reference to FIGS. 4A and 4B. FIGS. 4A and 4B illustrate a part of the photoelectric conversion unit 25. In FIGS. 4A and 4B, the linear part 48 is illustrated in a simplified manner in comparison with FIG. 3. In FIGS. 4A and 4B, an arrow α denotes a direction of an electric field generated around the linear part 48. In FIGS. 4A and 4B, an arrow β denotes a direction in which the electron E moves in the linear part 48. The potential control unit 62 switches a state illustrated in FIG. 4A and a state illustrated in FIG. 4B by controlling the electric potentials applied to the plurality of patterns 31, 32 and 33.

In the state illustrated in FIG. 4A, an electric potential applied to the pattern 33 is higher than an electric potential applied to the pattern 31, and is lower than an electric potential applied to the pattern 32. In other words, the electric potential applied to the bias portion P2 configured by the linear part 43 is lower than the electric potential applied to the antenna portion P1 configured by the linear part 48a. The electric potential applied to the bias portion P2 configured by the linear part 46 is higher than the electric potential applied to the antenna portion P1 configured by the linear part 48b.

In the state illustrated in FIG. 4A, an electric field generated between the leading end 38 and the leading end 34 is combined with an electric field generated between the leading end 38 and the leading end 35, and an electric field is generated in a +Z-axis direction. In this state, an electric field from the antenna portion P1 configured by the linear part 48a toward the bias portion P2 configured by the linear part 43 is generated. As a result, an electric potential barrier of the leading end portion of the antenna portion P1 configured by the linear part 48a becomes thick. In other words, an electric potential barrier in an antenna-vacuum interface becomes thicker due to an electric potential difference between the pattern 33 and the pattern 31. Therefore, the emission of electron E from the linear part 48a in response to the electromagnetic wave W entering the linear part 48a is suppressed. In the state illustrated in FIG. 4A, a component of the electric field from the leading end 38 of the linear part 48a toward the bias portion P2 configured by the linear part 43 in the Z-axis direction is positive.

In the state illustrated in FIG. 4A, an electric field generated between the leading end 39 and the leading end 36 is combined with an electric field generated between the leading end 39 and the leading end 37, and an electric field is generated in a +Z-axis direction. In this state, an electric field from the bias portion P2 configured by the linear part 46 toward the antenna portion P1 configured by the linear part 48b is generated. As a result, an electric potential barrier of the leading end portion of the antenna portion P1 configured by the linear part 48b becomes thin. In other words, an electric potential barrier in an antenna-vacuum interface becomes thinner due to an electric potential difference between the pattern 33 and the pattern 32. Therefore, the emission of electron E from the linear part 48b in response to the electromagnetic wave W entering the linear part 48b is promoted.

In the state illustrated in FIG. 4A, a component of the electric field from the bias portion P2 configured by the linear part 46 toward the antenna portion P1 configured by the linear part 48b in the Z-axis direction is positive. A component of the electric field from the bias portion P2 configured by the linear part 46 toward the leading end 39 of the linear part 48b in the Z-axis direction is positive. Therefore, in a case where the component of the electric field of the electromagnetic wave W entering the photoelectric conversion unit 25 in the Z-axis direction is positive, the electric potential barrier in the antenna-vacuum interface becomes further thinner in response to incidence of the electromagnetic wave W. As a result, in a case where the component of the electric field of the electromagnetic wave W entering the photoelectric conversion unit 25 in the Z-axis direction is positive, the electron E is emitted from the linear part 48b.

In the state illustrated in FIG. 4B, the electric potential applied to the pattern 33 is lower than the electric potential applied to the pattern 31, and higher than the electric potential applied to the pattern 32. In other words, the electric potential applied to the bias portion P2 configured by the linear part 43 is higher than the electric potential applied to the antenna portion P1 configured by the linear part 48a. The electric potential applied to the bias portion P2 configured by the linear part 46 is lower than the electric potential applied to the antenna portion P1 configured by the linear part 48b.

In the state illustrated in FIG. 4B, an electric field generated between the leading end 38 and the leading end 34 is combined with an electric field generated between the leading end 38 and the leading end 34, ad an electric field is generated in a direction of −Z-axis. In this state, an electric field from the bias portion P2 configured by the linear part 43 toward the antenna portion P1 configured by the linear part 48a is generated. As a result, an electric potential barrier of the leading end portion of the antenna portion P1 configured by the linear part 48a becomes thin. In other words, an electric potential barrier in the antenna-vacuum interface becomes thin due to an electric potential difference between the pattern 33 and the pattern 31. Therefore, the emission of electron E from the linear part 48a in response to the electromagnetic wave W entering the linear part 48a is promoted.

In the state illustrated in FIG. 4B, a component of the electric field from the bias portion P2 configured by the linear part 43 toward the antenna portion P1 configured by the linear part 48a in the Z-axis direction is negative. A component of the electric field from the bias portion P2 configured by the linear part 43 toward the leading end 38 of the linear part 48a in the Z-axis direction is negative. Therefore, in a case where the component of the electric field of the electromagnetic wave W entering the photoelectric conversion unit 25 in the Z-axis direction is negative, the electric potential barrier in the antenna-vacuum interface becomes further thinner in response to incidence of the electromagnetic wave W. As a result, in a case where the component of the electric field of the electromagnetic wave W entering the photoelectric conversion unit 25 in the Z-axis direction is negative, the electron E is emitted from the linear part 48a.

In the state illustrated in FIG. 4B, an electric field generated between the leading end 39 and the leading end 36 is combined with an electric field generated between the leading end 39 and the leading end 37, and an electric field is generated in a direction of −Z-axis. In this state, an electric field from the antenna portion P1 configured by the linear part 48b toward the bias portion P2 configured by the linear part 46 is generated. As a result, an electric potential barrier in the leading end portion of the antenna portion P1 configured by the linear part 48b becomes thick. In other words, an electric potential barrier in an antenna-vacuum interface becomes thicker due to an electric potential difference between the pattern 33 and the pattern 32. Therefore, the emission of electron E from the linear part 48b in response to the electromagnetic wave W entering the linear part 48b is suppressed. In the state illustrated in FIG. 4B, a component of the electric field from the leading end 39 of the linear part 48b toward the bias portion P2 configured by the linear part 46 in the Z-axis direction is negative.

Figure 5:
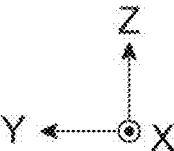
FIG. 5 is a plan view of an electron emitter according to a modification of the present embodiment.

Next, a modification of the electron emitter will be described with reference to FIG. 5. FIG. 5 is a plan view of an electron emitter according to the modification of the present embodiment. In this modification, an electron emitter 20 has a meta-surface 22A. The meta-surface 22A is of an active type, and is operated by application of a bias voltage. The meta-surface 22A is operated by application of an electric potential by means of a power supply unit 60.

As illustrated in FIG. 5, the meta-surface 22A includes at least one photoelectric conversion unit 25A. The photoelectric conversion unit 25A emits an electron E in response to incidence of an electromagnetic wave W having a corresponding directional component of the electric field and a corresponding wavelength. For example, the photoelectric conversion unit 25A has a sensitivity for a Z-axis directional component in the electric field of the electromagnetic wave W. A state where the photoelectric conversion unit 25A has the sensitivity for a positive component in the Z-axis direction and a state where the photoelectric conversion unit has the sensitivity for a negative component in the Z-axis direction are switched according to the electric potential control by the potential control unit 62. The frequency range and the directional component of the electric field for which the photoelectric conversion unit 25A has the sensitivity are not limited to the above.

As illustrated in FIG. 5, the meta-surface 22A includes a plurality of patterns 31A, 32A and 33A which are spaced away from each other. A directional component of the electric field and a frequency range for which the photoelectric conversion unit 25A has a sensitivity depends on configurations of the plurality of patterns 31A, 32A and 33A. The plurality of patterns 31A, 32A and 33A include an antenna portion P1 and a bias portion P2.

Each of the patterns 31A, 32A and 33A is disposed on a principal surface 21b of a supporting body 21. The plurality of patterns 31A, 32A and 33A are connected via an oxide layer. The plurality of patterns 31A, 32A and 33A are separated from each other by the oxide layer, and are insulated from each other at least when the photoelectric conversion device 2 is not operated. Each of the patterns 31A, 32A and 33A is a conductive line, and conducts the electron. Each of the patterns 31A, 32A and 33A includes a metal layer which is formed at least on the oxide layer of the meta-surface 22A. A material of the metal layer includes, for example, gold.

In the example illustrated in FIG. 5, the pattern 31A includes a linear part 41A extending in a Y-axis direction. The linear part 41A is formed, for example, into a linear shape. The pattern 31A includes a plurality of linear parts 42A each extending in a direction of −Z-axis. The plurality of linear parts 42A are spaced away from each other. Each of the linear parts 42A is formed, for example, into a linear shape. Each of the linear parts 42A is connected to the linear part 41A in one end thereof. Each of the linear parts 42A includes a leading end 34A. The leading end 34A is a portion which is positioned in an opposite side to one end connected to the linear part 41A in each of the linear parts 42A.

The pattern 32A includes a linear part 44A extending in a Y-axis direction. The linear part 44A is formed, for example, into a linear shape. The pattern 32A includes a plurality of linear parts 45A each extending in a +Z-axis direction. The plurality of linear parts 45A are spaced away from each other. Each of the linear parts 45A is formed, for example, into a linear shape. Each of the linear parts 45A is connected to the linear part 44A in one end thereof. Each of the linear parts 45A includes a leading end 36A. The leading end 36A is a portion which is positioned in an opposite side to one end connected to the linear part 44A, in each of the linear parts 45A. The pattern 32A extends toward the patterns 31A and 33A.

The pattern 33A includes a leading end 38A facing the pattern 31A. The pattern 33A includes a leading end 39A facing the pattern 32A. For example, in a case where the leading end 38A is a first leading end, the leading end 39A is a second leading end. In the present embodiment, in a state where a lower electric potential than the pattern 31A or the pattern 32A is applied to the pattern 33A, the pattern 33A emits the electron E in response to incidence of the electromagnetic wave W.

The pattern 33A includes a linear part 47A extending in a Y-axis direction. The linear part 47A is formed, for example, into a linear shape. For example, the linear part 47A is in parallel to the linear part 41A and the linear part 44A. The pattern 33A includes a plurality of linear parts 49 each extending in a Z-axis direction. The plurality of linear parts 49 are spaced away from each other. For example, the plurality of linear parts 49 are in parallel to each other. Each of the linear parts 49 extends in a +Z-axis direction and a −Z-axis direction from a portion connected to the linear part 47A. Each of the linear parts 49 is connected to the linear part 47A at the center thereof. Each of the linear parts 49 is formed, for example, into a linear shape. Each of the linear parts 49 includes a pair of linear parts 49a and 49b. The linear part 49a extends in +Z-axis direction from a portion connected to the linear part 47A. The linear part 49b extends in the direction of −Z-axis from a portion connected to the linear part 47A. A pair of linear parts 49a and 49b in each of the linear parts 49 extend on the same line in the Z-axis direction. Each of the linear parts 49 is disposed between the pattern 31A and the pattern 32A in the Z-axis direction. In other words, each of the linear parts 49 is disposed between the linear part 42A and the linear part 45A in the Z-axis direction.

Each of the linear parts 49 includes the leading end 38A and the leading end 39A mentioned above. The leading end 38A and the leading end 39A are disposed at mutually different positions in the Z-axis direction. The leading ends 38A and 39A are positioned in both ends of each of the linear parts 49. Each of the linear parts 49 is connected to the linear part 47A between the leading end 38A and the leading end 39A. The leading end 38A is included in the linear part 49a. The leading end 39A is included in the linear part 49b. The leading end 38A and the leading end 39A included in the same linear part 49 are disposed on the same line in the Z-axis direction.

The leading end 38A of the pattern 33A is a portion which is the closest to the pattern 31A in the linear part 49 including the leading end 38A. The leading end 38A is disposed closer to the corresponding linear part 42A than the other portions of the pattern 33A. The leading end 38A faces the leading end 34A of the pattern 31A.

The leading end 39A of the pattern 33A is a portion which is the closest to the pattern 32A in the linear part 49 including the leading end 39A. The leading end 39A is disposed closer to the corresponding linear part 45A than the other portions of the pattern 33A. The leading end 39A faces the leading end 36A of the pattern 32A. The leading end 34A and the leading end 38A facing each other are disposed on the same line in the Z-axis direction. The leading end 39A and the leading end 36A facing each other are disposed on the same line in the Z-axis direction.

In the photoelectric conversion unit 25A, each of the linear part 42A and the linear part 45A configures a bias portion P2, and the linear part 49 configures an antenna portion P1. The antenna portion P1 extends in the Z-axis direction, and each of two bias portions P2 faces the antenna portion P1. The leading end 38A and the leading end 39A, and two bias portions P2 are disposed in the order of the bias portion P2 configured by the linear part 45A, the leading end 39A, the leading end 38A and the bias portion P2 configured by the linear part 42A in the Z-axis direction. For example, in a case where the bias portion P2 configured by the linear part 42A is a first bias portion, the bias portion P2 configured by the linear part 45A is a second bias portion.

The photoelectric conversion unit 25A is configured to correspond to a range of wavelength, for example, from a so-called millimeter wave to an infrared light by a change of a configuration of the linear part 49. For example, a length of the linear part 49 in the Z-axis direction corresponds to a wavelength region of the electromagnetic wave W which allows the electron E to be emitted in the photoelectric conversion unit 25A. For example, the length of the linear part 49 in the Z-axis direction is designed according to a desired wavelength region emitting the electron E from the photoelectric conversion unit 25A. For example, each of the linear parts 49 has a length which is half the length of a center wavelength in the desired wavelength region. The length of each of the linear parts 49 is a length from the leading end 38A to the leading end 39A in the Z-axis direction. In a case where the electromagnetic wave having passed through the supporting body 21 enters the linear part 49 in the same manner as the linear part 48, a refractive index of the supporting body 21 through which the electromagnetic wave has passed is also taken into consideration.

The electron emitter 20 is further provided with a plurality of electrodes 71, 72 and 73 which are spaced away from each other, as illustrated in FIG. 5. The plurality of electrodes 71, 72 and 73 are provided on the principal surface 21b of the supporting body 21. The plurality of electrodes 71, 72 and 73 are electrically connected to the photoelectric conversion unit 25A. In the present embodiment, each of the electrodes 71, 72 and 73 is formed into a rectangular shape. Each of the electrodes 71, 72 and 73 may be formed into a linear shape in the same manner as the linear part 41A, the linear part 44A or the linear part 47A. Each of the electrodes 71, 72 and 73 may be integrally formed with the linear part 41A, the linear part 44A or the linear part 47A.

For example, the electrode 71 is electrically connected to the linear part 47A of the photoelectric conversion unit 25A. The electrode 72 is electrically connected to the linear part 41A of the photoelectric conversion unit 25A. The electrode 73 is electrically connected to the linear part 44A of the photoelectric conversion unit 25A. The photoelectric conversion unit 25A is operated by application of electric potential from the power supply unit 60 via the plurality of electrodes 71, 72 and 73. The potential application unit 61 of the power supply unit 60 applies the electric potential to the photoelectric conversion unit 25A via the plurality of electrodes 71, 72 and 73. The potential control unit 62 of the power supply unit 60 controls the electric potential applied to the photoelectric conversion unit 25A.

Figure 6A:
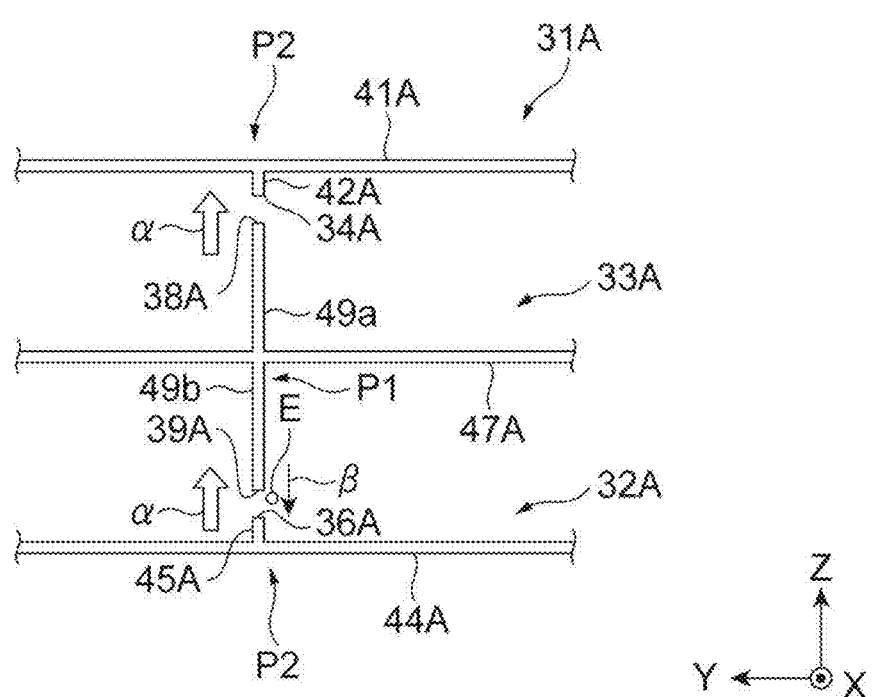
FIG. 6A is a view for describing an operation of a photoelectric conversion device according to a modification of the present embodiment.
Figure 6B:
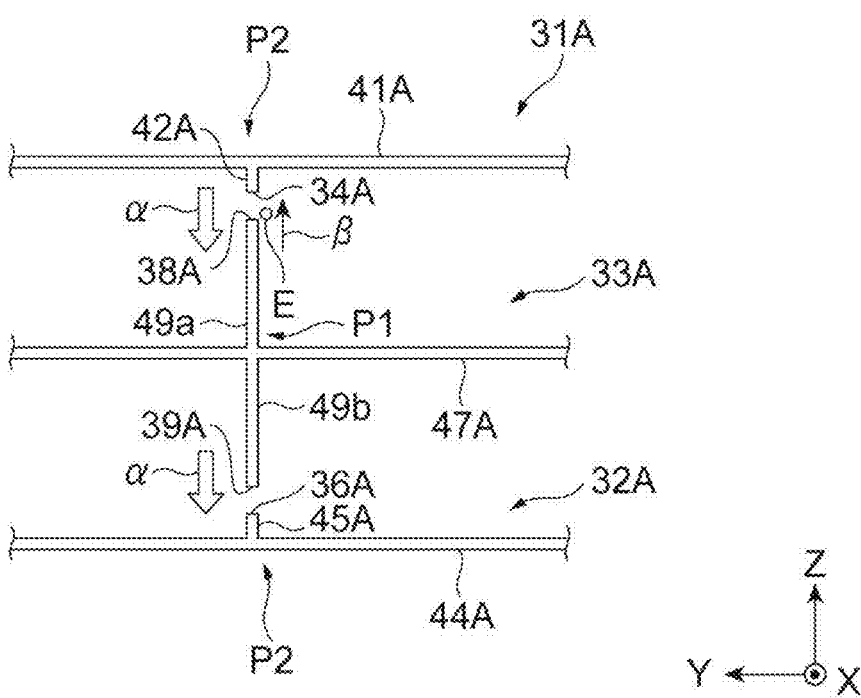
FIG. 6B is a view for describing an operation of a photoelectric conversion device according to a modification of the present embodiment.

Next, an operation of the photoelectric conversion device 2 according to the modification of the present embodiment will be described in detail with reference to FIGS. 6A and 6B. FIGS. 6A and 6B illustrate a part of the photoelectric conversion unit 25A. In FIGS. 6A and 6B, an arrow α denotes a direction of an electric field generated around the linear part 49. In FIGS. 6A and 6B, an arrow β denotes a direction in which the electron E moves in the linear part 49. The potential control unit 62 switches a state illustrated in FIG. 6A and a state illustrated in FIG. 6B by controlling the electric potentials applied to the plurality of patterns 31A, 32A and 33A.

In the state illustrated in FIG. 6A, an electric potential applied to the pattern 33A is higher than an electric potential applied to the pattern 31A, and is lower than an electric potential applied to the pattern 32A. In other words, the electric potential applied to the bias portion P2 configured by the linear part 42A is lower than the electric potential applied to the antenna portion P1 configured by the linear part 49a. The electric potential applied to the bias portion P2 configured by the linear part 45A is higher than the electric potential applied to the antenna portion P1 configured by the linear part 49b.

In the state illustrated in FIG. 6A, an electric field is generated in a +Z-axis direction between the leading end 38A and the leading end 34A. In this state, an electric field from the antenna portion P1 configured by the linear part 49a toward the bias portion P2 configured by the linear part 42A is generated. As a result, an electric potential barrier of the leading end portion of the antenna portion P1 configured by the linear part 49a becomes thick. In other words, an electric potential barrier in an antenna-vacuum interface becomes thicker due to an electric potential difference between the pattern 33A and the pattern 31A. Therefore, the emission of electron E from the linear part 49a in response to the electromagnetic wave W entering the linear part 49a is suppressed. In the state illustrated in FIG. 6A, a component of the electric field from the leading end 38A of the linear part 49a toward the bias portion P2 configured by the linear part 42A in the Z-axis direction is positive.

In the state illustrated in FIG. 6A, an electric field is generated in a +Z-axis direction between the leading end 39A and the leading end 36A. In this state, an electric field from the bias portion P2 configured by the linear part 45A toward the antenna portion P1 configured by the linear part 49b is generated. As a result, an electric potential barrier of the leading end portion of the antenna portion P1 configured by the linear part 49b becomes thin. In other words, an electric potential barrier in an antenna-vacuum interface becomes thinner due to an electric potential difference between the pattern 33A and the pattern 32A. Therefore, the emission of electron E from the linear part 49b in response to the electromagnetic wave W entering the linear part 49b is promoted.

In the state illustrated in FIG. 6A, a component of the electric field from the bias portion P2 configured by the linear part 45A toward the antenna portion P1 configured by the linear part 49b in the Z-axis direction is positive. A component of the electric field from the bias portion P2 configured by the linear part 45A toward the leading end 39A of the linear part 49b in the Z-axis direction is positive. Therefore, in a case where the component of the electric field of the electromagnetic wave W entering the photoelectric conversion unit 25A in the Z-axis direction is positive, the electric potential barrier in the antenna-vacuum interface becomes further thinner in response to incidence of the electromagnetic wave W. As a result, in a case where the component of the electric field of the electromagnetic wave W entering the photoelectric conversion unit 25A in the Z-axis direction is positive, the electron E is emitted from the linear part 49b.

In the state illustrated in FIG. 6B, the electric potential applied to the pattern 33A is lower than the electric potential applied to the pattern 31A, and higher than the electric potential applied to the pattern 32A. In other words, the electric potential applied to the bias portion P2 configured by the linear part 42A is higher than the electric potential applied to the antenna portion P1 configured by the linear part 49a. The electric potential applied to the bias portion P2 configured by the linear part 45A is lower than the electric potential applied to the antenna portion P1 configured by the linear part 49b.

In the state illustrated in FIG. 6B, an electric field is generated in a direction of −Z-axis between the leading end 38A and the leading end 34A. In this state, an electric field from the bias portion P2 configured by the linear part 42A toward the antenna portion P1 configured by the linear part 49a is generated. As a result, an electric potential barrier of the leading end portion of the antenna portion P1 configured by the linear part 49a becomes thin. In other words, an electric potential barrier in the antenna-vacuum interface becomes thin due to an electric potential difference between the pattern 33A and the pattern 31A. Therefore, the emission of electron E from the linear part 49a in response to the electromagnetic wave W entering the linear part 49a is promoted.

In the state illustrated in FIG. 6B, a component of the electric field from the bias portion P2 configured by the linear part 42A toward the antenna portion P1 configured by the linear part 49a in the Z-axis direction is negative. A component of the electric field from the bias portion P2 configured by the linear part 42A toward the leading end 38A of the linear part 49a in the Z-axis direction is negative. Therefore, in a case where the component of the electric field of the electromagnetic wave W entering the photoelectric conversion unit 25A in the Z-axis direction is negative, the electric potential barrier in the antenna-vacuum interface becomes further thinner in response to incidence of the electromagnetic wave W. As a result, in a case where the component of the electric field of the electromagnetic wave W entering the photoelectric conversion unit 25A in the Z-axis direction is negative, the electron E is emitted from the linear part 49a.

In the state illustrated in FIG. 6B, an electric field is generated in a direction of −Z-axis between the leading end 39A and the leading end 36A. In this state, an electric field from the antenna portion P1 configured by the linear part 49b toward the bias portion P2 configured by the linear part 45A is generated. As a result, an electric potential barrier in the leading end portion of the antenna portion P1 configured by the linear part 49b becomes thick. In other words, an electric potential barrier in an antenna-vacuum interface becomes thicker due to an electric potential difference between the pattern 33A and the pattern 32A. Therefore, the emission of electron E from the linear part 49b in response to the electromagnetic wave W entering the linear part 49b is suppressed. In the state illustrated in FIG. 6B, a component of the electric field from the leading end 39A and the linear part 49b toward the bias portion P2 configured by the linear part 45A in the Z-axis direction is negative.

Figure 7:
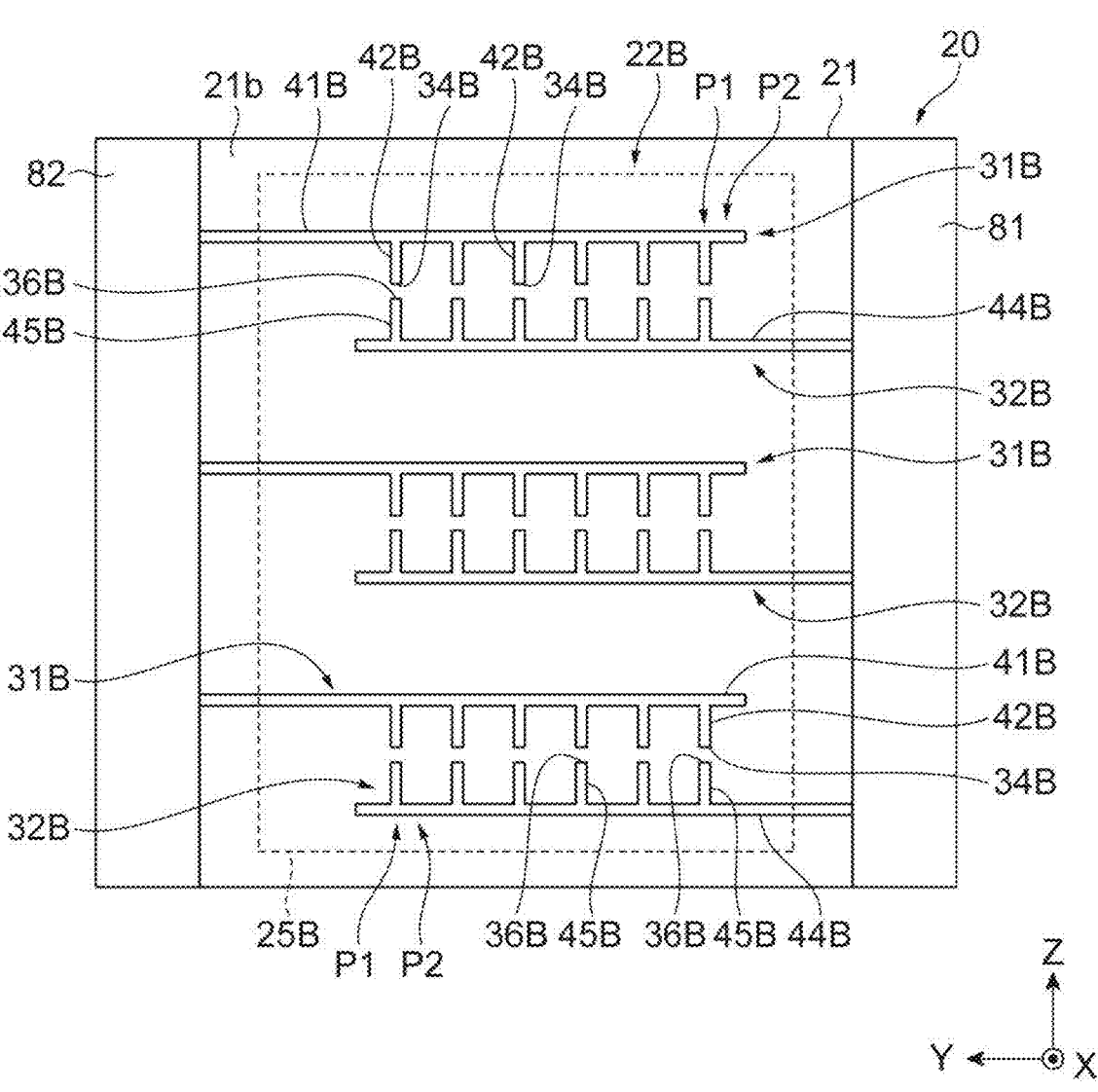
FIG. 7 is a plan view of an electron emitter according to a modification of the present embodiment.

Next, a modification of the electron emitter will be described with reference to FIG. 7. FIG. 7 is a plan view of an electron emitter according to the modification of the present embodiment. In this modification, an electron emitter 20 has a meta-surface 22B. The meta-surface 22B is of an active type, and is operated by application of a bias voltage. The meta-surface 22B is operated by application of electric potentials by means of a power supply unit 60.

As illustrated in FIG. 7, the meta-surface 22B includes at least one photoelectric conversion unit 25B. The photoelectric conversion unit 25B emits an electron E in response to incidence of an electromagnetic wave W having a corresponding directional component of the electric field and a corresponding wavelength. For example, the photoelectric conversion unit 25B has a sensitivity for a Z-axis directional component of the electric field of the electromagnetic wave W. A state where the photoelectric conversion unit 25B has the sensitivity for a positive component in the Z-axis direction and a state where the photoelectric conversion unit 25B has the sensitivity for a negative component in the Z-axis direction are switched according to the electric potential control by the potential control unit 62. The frequency range and the directional component of the electric field for which the photoelectric conversion unit 25B has the sensitivity are not limited to the above.

As illustrated in FIG. 7, the meta-surface 22B includes a plurality of patterns 31B and 32B which are spaced away from each other. A directional component of the electric field and a frequency range for which the photoelectric conversion unit 25B has a sensitivity depends on configurations of the plurality of patterns 31B and 32B. The plurality of patterns 31B and 32B include an antenna portion P1 and a bias portion P2.

Each of the patterns 31B and 32B is disposed on a principal surface 21b of a supporting body 21. The plurality of patterns 31B and 32B are connected via an oxide layer. The plurality of patterns 31B and 32B are separated from each other by the oxide layer, and are insulated from each other at least when the photoelectric conversion device 2 is not operated. Each of the patterns 31B and 32B is a conductive line, and conducts the electron. Each of the patterns 31B and 32B includes a metal layer which is formed at least on the oxide layer of the meta-surface 22B. A material of the metal layer includes, for example, gold.

In the example illustrated in FIG. 7, the pattern 31B includes a linear part 41B extending in a Y-axis direction. The linear part 41B is formed, for example, into a linear shape. The pattern 31B includes a plurality of linear parts 42B each extending in a direction of −Z-axis. The plurality of linear parts 42B are spaced away from each other. Each of the linear parts 42B is formed, for example, into a linear shape. Each of the linear parts 42B is connected to the linear part 41B in one end thereof. Each of the linear parts 42B includes a leading end 34B. The leading end 34B is a portion which is positioned in an opposite side to one end connected to the linear part 41B in each of the linear parts 42B.

The pattern 32B includes a linear part 44B extending in a Y-axis direction. The linear part 44B is formed, for example, into a linear shape. The pattern 32B includes a plurality of linear parts 45B each extending in a +Z-axis direction. The plurality of linear parts 45B are spaced away from each other. Each of the linear parts 45B is formed, for example, into a linear shape. Each of the linear parts 45B is connected to the linear part 44B in one end thereof. Each of the linear parts 45B includes a leading end 36B. The leading end 36B is a portion which is positioned in an opposite side to one end connected to the linear part 44B in each of the linear parts 45B. The linear part 42B and the linear part 45B are spaced away from each other and face each other in the Z-axis direction.

The leading end 34B of the pattern 31B is a portion which is the closest to the corresponding pattern 32B in the pattern 31B. The leading end 34B is disposed closer to the corresponding linear part 45B than the other portions of the pattern 31B. In the linear part 42B and the linear part 45B corresponding to each other, the leading end 34B and the leading end 36B face each other.

The leading end 36B of the pattern 32B is a portion which is the closest to the corresponding pattern 31B in the pattern 32B. The leading end 36B is disposed closer to the corresponding linear part 42B than the other portions of the pattern 32B. The leading end 34B and the leading end 36B facing each other are disposed on the same line in the Z-axis direction.

In the photoelectric conversion unit 25B, each of the linear parts 42B can emit the electron E in response to incidence of the electromagnetic wave W in a state where a lower electric potential than the linear part 45B is applied thereto. In this state, the linear part 45B configures the bias portion P2, and the linear part 42B configures the antenna portion P1. The antenna portion P1 extends in the Z-axis direction, and the bias portion P2 faces the antenna portion P1.

In the photoelectric conversion unit 25B, each of the linear parts 45B can emit the electron E in response to incidence of the electromagnetic wave W in a state where a lower electric potential than the linear part 42B is applied thereto. In this state, the linear part 42B configures the bias portion P2, and the linear part 45B configures the antenna portion P1. In this case, the antenna portion P1 extends in the Z-axis direction, and the bias portion P2 faces the antenna portion P1. As described above, in the photoelectric conversion unit 25B, both of the linear part 42B and the linear part 45B are configured as the antenna portion P1 and the bias portion P2.

The photoelectric conversion unit 25B is configured to correspond to a range of wavelength, for example, from a so-called millimeter wave to an infrared light by a change of the configurations of the linear part 42B and 45B. For example, a length of the linear part 42B and a length of the linear part 45B in the Z-axis direction correspond to a wavelength region of the electromagnetic wave W which allows the electron E to be emitted in the photoelectric conversion unit 25B. For example, the length of the linear part 42B and the length of the linear part 45B in the Z-axis direction are designed according to a desired wavelength region emitting the electron E from the photoelectric conversion unit 25B. For example, each of the linear parts 42B and 45B in the Z-axis direction has a length which is half the length of a center wavelength in the desired wavelength region. In a case where the electromagnetic wave having passed through the supporting body 21 enters the linear parts 42B and 45B in the same manner as the linear part 48, a refractive index of the supporting body 21 through which the electromagnetic wave has passed is also taken into consideration.

The electron emitter 20 is further provided with a plurality of electrodes 81 and 82 which are spaced away from each other, as illustrated in FIG. 7. The plurality of electrodes 81 and 82 are provided on the principal surface 21b of the supporting body 21. The plurality of electrodes 81 and 82 are electrically connected to the photoelectric conversion unit 25B. In the present embodiment, each of the electrodes 81 and 82 is formed into a rectangular shape. Each of the electrodes 81 and 82 may be formed into a linear shape in the same manner as the linear part 41B or the linear part 44B. Each of the electrodes 81 and 82 may be integrally formed with the linear part 41B or the linear part 44B.

For example, the electrode 81 is electrically connected to the linear part 44B of the photoelectric conversion unit 25B. The electrode 82 is electrically connected to the linear part 41B of the photoelectric conversion unit 25B. The photoelectric conversion unit 25B is operated by application of electric potentials from the power supply unit 60 via the plurality of electrodes 81 and 82. The potential application unit 61 of the power supply unit 60 applies the electric potential to the photoelectric conversion unit 25B via the plurality of electrodes 81 and 82. The potential control unit 62 of the power supply unit 60 controls the electric potential applied to the photoelectric conversion unit 25B.

Figure 8A:
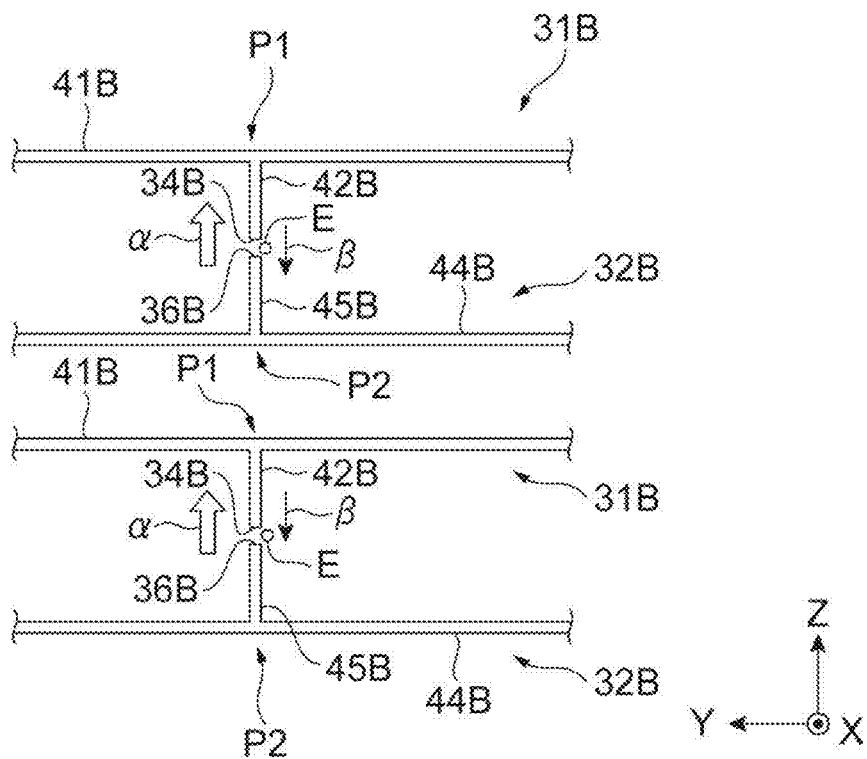
FIG. 8A is a view for describing an operation of a photoelectric conversion device according to a modification of the present embodiment.
Figure 8B:
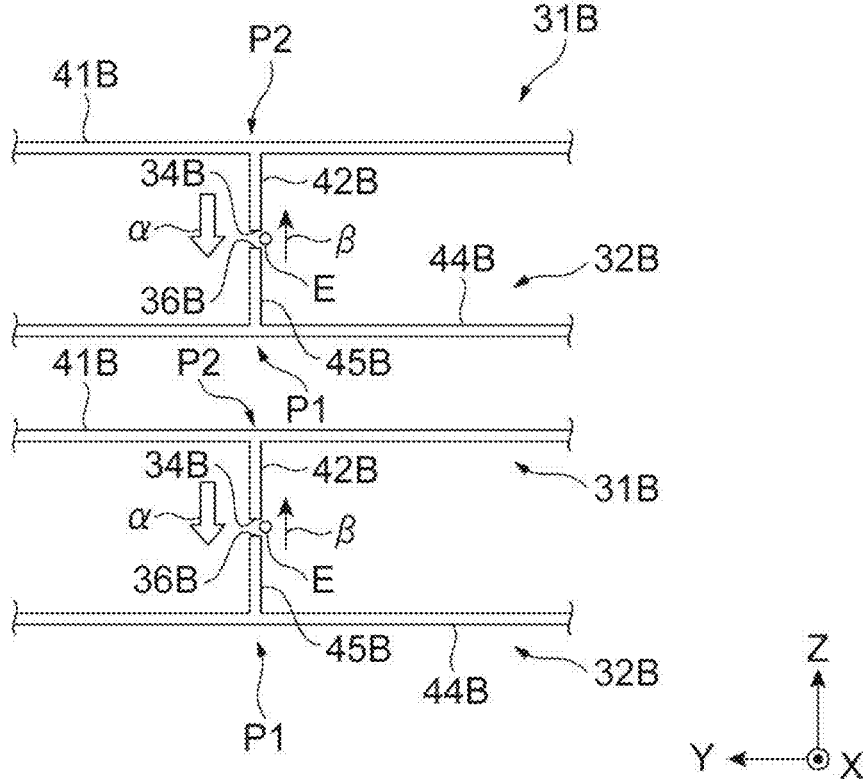
FIG. 8B is a view for describing an operation of a photoelectric conversion device according to a modification of the present embodiment.

Next, an operation of the photoelectric conversion device 2 according to the modification of the present embodiment will be described in detail with reference to FIGS. 8A and 8B. FIGS. 8A and 8B illustrate a part of the photoelectric conversion unit 25B. In FIGS. 8A and 8B, an arrow α denotes a direction of an electric field generated around the linear part 42B and the linear part 45B. In FIGS. 8A and 8B, an arrow β denotes a direction in which the electron E moves in the linear part 42B and the linear part 45B. The potential control unit 62 switches a state illustrated in FIG. 8A and a state illustrated in FIG. 8B by controlling the electric potentials applied to the plurality of patterns 31B and 32B.

In the state illustrated in FIG. 8A, an electric potential applied to the pattern 32B is higher than an electric potential applied to the pattern 31B. In other words, the electric potential applied to the leading end 36B is higher than the electric potential applied to the leading end 34B. In this state, an electric field is generated in a +Z-axis direction between the leading end 36B and the leading end 34B. In this state, an electric field from the bias portion P2 configured by the linear part 45B toward the antenna portion P1 configured by the linear part 42B is generated. As a result, an electric potential barrier of the leading end portion of the antenna portion P1 configured by the linear part 42B becomes thin. In other words, an electric potential barrier in an antenna-vacuum interface becomes thinner due to an electric potential difference between the pattern 31B and the pattern 32B. Therefore, the emission of electron E from the linear part 42B in response to the electromagnetic wave W entering the linear part 42B is promoted.

In the state illustrated in FIG. 8A, a component of the electric field from the bias portion P2 configured by the linear part 45B toward the antenna portion P1 configured by the linear part 42B in the Z-axis direction is positive. A component of the electric field from the leading end 36B of the linear part 45B toward the bias portion P1 configured by the linear part 42B in the Z-axis direction is positive. Therefore, in a case where the component of the electric field of the electromagnetic wave W entering the photoelectric conversion unit 25B in the Z-axis direction is positive, the electric potential barrier in the antenna-vacuum interface becomes further thinner in response to incidence of the electromagnetic wave W. As a result, in a case where the component of the electric field of the electromagnetic wave W entering the photoelectric conversion unit 25B in the Z-axis direction is positive, the electron E is emitted from the linear part 42B.

In the state illustrated in FIG. 8B, the electric potential applied to the pattern 32B is lower than the electric potential applied to the pattern 31B. In other words, the electric potential applied to the leading end 36B is lower than the electric potential applied to the leading end 34B. In this state, an electric field is generated in a direction of −Z-axis between the leading end 36B and the leading end 34B. In this state, an electric field from the bias portion P2 configured by the linear part 42B toward the antenna portion P1 configured by the linear part 45B is generated. As a result, an electric potential barrier of the leading end portion of the antenna portion P1 configured by the linear part 45B becomes thin. In other words, an electric potential barrier in the antenna-vacuum interface becomes thin due to an electric potential difference between the pattern 31B and the pattern 32B. Therefore, the emission of electron E from the linear part 42B in response to the electromagnetic wave W entering the linear part 45B is promoted.

In the state illustrated in FIG. 8B, a component of the electric field from the bias portion P2 configured by the linear part 42B toward the antenna portion P1 configured by the linear part 45B in the Z-axis direction is negative. A component of the electric field from the bias portion P2 configured by the linear part 42B toward the leading end 36B of the linear part 45B in the Z-axis direction is negative. Therefore, in a case where the component of the electric field of the electromagnetic wave W entering the photoelectric conversion unit 25B in the Z-axis direction is negative, the electric potential barrier in the antenna-vacuum interface becomes further thinner in response to incidence of the electromagnetic wave W. As a result, in a case where the component of the electric field of the electromagnetic wave W entering the photoelectric conversion unit 25B in the Z-axis direction is negative, the electron E is emitted from the linear part 45B.

As described above, in the photoelectric conversion unit 25B, the linear part 42B can act as both the antenna portion P1 which emits the electron E in response to incidence of the electromagnetic wave W, and the bias portion P2 which generates the electric field between the linear part 42B and the linear part 45B. In the photoelectric conversion unit 25B, the linear part 45B doubles as both the antenna portion P1 which emits the electron E in response to incidence of the electromagnetic wave W, and the bias portion P2 which generates the electric field between the linear part 45B and the linear part 42B. One of the linear part 42B and the linear part 45B doubles as both the antenna portion P1 which emits the electron E in response to incidence of the electromagnetic wave W, and the bias portion P2 which generates the electric field between the one and the other of the linear part 42B and the linear part 45B.

Photoelectric Conversion Method

Figure 9:
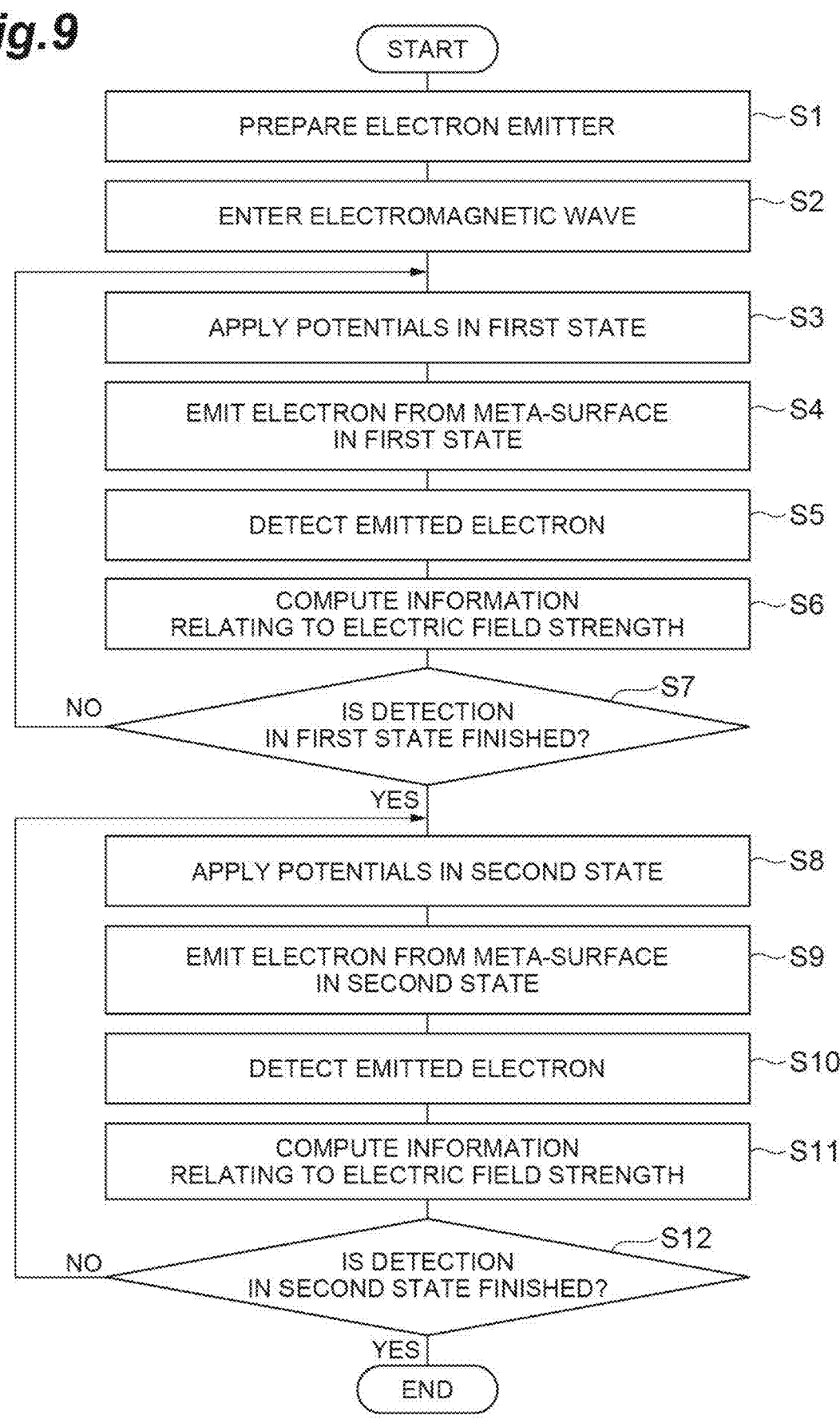
FIG. 9 is a flow chart of an electromagnetic wave detection method.

Next, an electromagnetic wave detection method according to the present embodiment will be described with reference to FIG. 9. The electromagnetic wave detection method includes a photoelectric conversion method emitting an electron in response to an entered electromagnetic wave. The electromagnetic wave detection method can be also applied a modification illustrated in FIGS. 5 to 8B. FIG. 9 is a flow chart of the electromagnetic wave detection method according to the present embodiment. In the electromagnetic wave detection method illustrated in FIG. 9, an electron E is emitted from a meta-surface 22 at different timings for each polarity of an electric field strength of an electromagnetic wave W entering the meta-surface 22 by controlling a state of electric potential applied to the meta-surface 22. As a result, the electric field strength of the electromagnetic wave W entering the meta-surface 22 is measured for each polarity.

First, an electron emitter 20 is prepared (process S1). For example, an electromagnetic wave detection device 1 with the electron emitter 20 is disposed.

Next, an electromagnetic wave W to be measured enters the electron emitter 20 (process S2). In the present embodiment, in the process S2, the application of the electromagnetic wave W to the electron emitter 20 is started, and the application of the electromagnetic wave W to the electron emitter 20 is continued until the detection of the electromagnetic wave W is finished.

Next, electric potentials in a first state are applied to the meta-surface 22 (process S3). The first state is a state where the electric potentials are applied to the meta-surface 22 in such a manner that the component of the electric field from the bias portion P2 toward the antenna portion P1 in the Z-axis direction is positive. For example, the potential control unit 62 applies the electric potentials in the first state to each of patterns 31, 32 and 33. The states illustrated in FIGS. 4A, 6A and 8A correspond to the first state.

For example, in the configuration illustrated in FIG. 3, the electric potentials are applied to the meta-surface 22 in the process S3 in such a manner that the component of the electric field from the leading end 38 toward the bias portion P2 configured by the linear part 43 in the Z-axis direction is positive and that the component of the electric field from the bias portion P2 configured by the linear part 46 toward the leading end 39 in the Z-axis direction is positive. In the state illustrated in FIG. 4A, the electric potential applied to the bias portion P2 configured by the linear part 43 is lower than the electric potential applied to the antenna portion P1, and the electric potential applied to the bias portion P2 configured by the linear part 46 is higher than the electric potential applied to the antenna portion P1. In other words, in the state illustrated in FIG. 4A, the electric potential applied to the pattern 32 is higher than the electric potential applied to the pattern 33, and the electric potential applied to the pattern 31 is lower than the electric potential applied to the pattern 33. For example, in the configuration illustrated in FIG. 7, the linear part 42B configures the antenna portion P1 and the linear part 45B configures the bias portion P2 in the process S3.

Next, in the first state, the electron E is emitted from the meta-surface 22 in response to the incidence of the electromagnetic wave W to be measured (process S4). When the electromagnetic wave W to be measured enters the meta-surface 22 in the first state, in the process S4, the electron E is emitted from the antenna portion P1.

Next, in the first state, the electron E emitted from the electron emitter 20 is detected (process S5). In the process S5, the electron collecting unit 50 collects the electron E in the first state, and detects the electron E emitted from the electron emitter 20 in the first state. In the process S5, the computing unit 70 acquires a signal output from the electron collecting unit 50.

Next, the information relating to the electric field strength of the electromagnetic wave W is computed based on the result of detection of the electron collecting unit 50 in the first state (process S6). In the process S6, the computing unit 70 computes the information relating to the positive component of the electric field strength of the electromagnetic wave W in the Z-axis direction, based on the result of detection in the process S5.

In the process S4, the electron E is emitted from the linear part 48*b*, for example, in a case where the component of the electric field of the electromagnetic wave W entering the photoelectric conversion unit 25 in the Z-axis direction is positive since the component of the electric field from the bias portion P2 toward the antenna portion P1 in the Z-axis direction is positive. Therefore, in the process S5, the electromagnetic wave W in which the component of the electric field in the Z-axis direction is positive is detected. An amount of the electron E emitted from the electron emitter 20 in the process S4 is associated with the electric field strength of the positive component in the Z-axis direction. Therefore, the electric field strength of the positive component in the Z-axis direction is measured among the electromagnetic wave W entering the photoelectric conversion unit 25 according to the process S4 to the process S6. At least the process S4 and the process S5 are performed, for example, during a predetermined measurement time. For example, the computing unit 70 acquires the information relating to the amount of the electron E collected by the electron collecting unit 50 at a predetermined first measurement time, and outputs the result of computation based on the acquired information. The first measurement time is, for example, several nano seconds.

Next, whether or not the detection process of the electromagnetic wave W in the first state is finished is determined (process S7). In a case where it is determined in the process S7 that the detection process is not finished, the process goes to the process S3. In a case where it is determined in the process S7 that the detection process is finished, the process goes to a process S8. The determination in the process S7 is performed, for example, by the potential control unit 62. The potential control unit 62 determines, for example, whether or not the first measurement time mentioned above has elapsed. In this case, the potential control unit 62 determines, for example, not to finish the detection process when the first measurement time has not elapsed, and determines to finish the detection process when the first measurement time has elapsed.

For example, the potential control unit 62 may determine whether or not the process S5 has been performed a predetermined number of times. In this case, for example, the potential control unit 62 may determine not to finish the detection process in a case where the number of times that the process S5 has been performed is equal to or less than the predetermined number of times, and may determine to finish the detection process in a case where the number of times that the process S5 has been performed is more than the predetermined number of times. The determination in the process S7 may be performed by the computing unit 70 or may be performed by the other control unit in the electromagnetic wave detection device 1.

In a case where it is determined in the process S7 that the detection process is finished, the electric potentials in the second state are applied to the meta-surface 22 (process S8). The second state is a state where the electric potentials are applied to the meta-surface 22 in such a manner that the component of the electric field from the bias portion P2 toward the antenna portion P1 in the Z-axis direction is negative. The potential control unit 62 applies, for example, the electric potentials in the second state to each of the patterns 31, 32 and 33. The states illustrated in FIGS. 4B, 6B and 8B correspond to the second state.

For example, in the configuration illustrated in FIG. 3, the electric potentials are applied to the meta-surface 22 in the process S8 in such a manner that the component of the electric field from the leading end 39 toward the bias portion P2 configured by the linear part 46 in the Z-axis direction is negative and that the component of the electric field from the bias portion P2 configured by the linear part 43 toward the leading end 38 in the Z-axis direction is positive. In the state illustrated in FIG. 4B, the electric potential applied to the bias portion P2 configured by the linear part 43 is higher than the electric potential applied to the antenna portion P1, and the electric potential applied to the bias portion P2 configured by the linear part 46 is lower than the electric potential applied to the antenna portion P1. In other words, in the state illustrated in FIG. 4B, the electric potential applied to the pattern 31 is higher than the electric potential applied to the pattern 33, and the electric potential applied to the pattern 32 is lower than the electric potential applied to the pattern 33. For example, in the configuration illustrated in FIG. 7, the linear part 42B configures the bias portion P2 and the linear part 45B configures the antenna portion P1 in the process S8.

Next, in the second state, the electron E is emitted from the meta-surface 22 in response to the incidence of the electromagnetic wave W to be measured (process S9). When the electromagnetic wave W to be measured enters the meta-surface 22 in the second state, in the process S9, the electron E is emitted from the antenna portion P1.

Next, in the second state, the electron E emitted from the electron emitter 20 is detected (process S10). In the process S10, the electron collecting unit 50 collects the electron E in the second state, and detects the electron E emitted from the electron emitter 20 in the second state. In the process S10, the computing unit 70 acquires a signal output from the electron collecting unit 50.

Next, the information relating to the electric field strength of the electromagnetic wave W is computed based on the result of detection of the electron collecting unit 50 in the second state (process S11). In the process S11, the computing unit 70 computes the information relating to the negative component of the electric field strength of the electromagnetic wave W in the Z-axis direction, based on the result of detection of the electron collecting unit 50 in the second state.

In the process S9, the electron E is emitted from the linear part 48a, for example, in a case where the component of the electric field of the electromagnetic wave W entering the photoelectric conversion unit 25 in the Z-axis direction is negative since the component of the electric field from the bias portion P2 toward the antenna portion P1 in the Z-axis direction is negative. Therefore, in the process S10, the electromagnetic wave W in which the component of the electric field in the Z-axis direction is negative is detected. An amount of the electron E emitted from the electron emitter 20 in the process S9 is associated with the electric field strength of the negative component in the Z-axis direction. Therefore, the electric field strength of the negative component in the Z-axis direction is measured among the electromagnetic wave W entering the photoelectric conversion unit 25 according to the process S9 to the process S11. At least the process S9 and the process S10 are performed, for example, during a predetermined measurement time. For example, the computing unit 70 acquires the information relating to the amount of the electron E collected by the electron collecting unit 50 at a predetermined second measurement time, and outputs the result of computation based on the acquired information. The second measurement time is, for example, the same as the first measurement time.

Next, whether or not the detection process of the electromagnetic wave W in the second state is finished is determined (process S12). In a case where it is determined in the process S12 that the detection process is not finished, the process goes to the process S7. In a case where it is determined in the process S12 that the detection process is finished, a series of processes of the electromagnetic wave detection is finished. The determination in the process S12 is performed, for example, by the potential control unit 62. The potential control unit 62 determines, for example, whether or not the second measurement time mentioned above has elapsed. In this case, the potential control unit 62 determines, for example, not to finish the detection process when the second measurement time has not elapsed, and determines to finish the detection process when the second measurement time has elapsed.

For example, the potential control unit 62 may determine whether or not the process S10 has been performed a predetermined number of times. In this case, for example, the potential control unit 62 may determine not to finish the detection process in a case where the number of times that the process S10 has been performed is equal to or less than the predetermined number of times, and may determine to finish the detection process in a case where the number of times that the process S10 has been performed is more than the predetermined number of times. The determination in the process S12 may be performed by the computing unit 70 or may be performed by the other control unit in the electromagnetic wave detection device 1.

The order from the process S2 to the process S12 is not limited to the order illustrated in FIG. 9. For example, the process S8 to the process S12 may be performed prior to the process S3 to the process S7. For example, the process S6 and the process S11 may be performed after the process S12. For example, the incidence of the electromagnetic wave W may be performed only during the process S4 and the process S5, and during the process S9 and the process S10.

As mentioned above, in the detection method of the electromagnetic wave according to the present embodiment, the electron E emitted from the electron emitter 20 is detected in each of the first state and the second state. Therefore, each of the electric field strength of the positive component in the Z-axis direction and the electric field strength of the negative component in the Z-axis direction can be measured among the electromagnetic wave W entering the electron emitter 20. In other words, the measurement of the electric field strength of the electromagnetic wave W entering the meta-surface 22 can be achieved for each polarity.

Figure 10A:
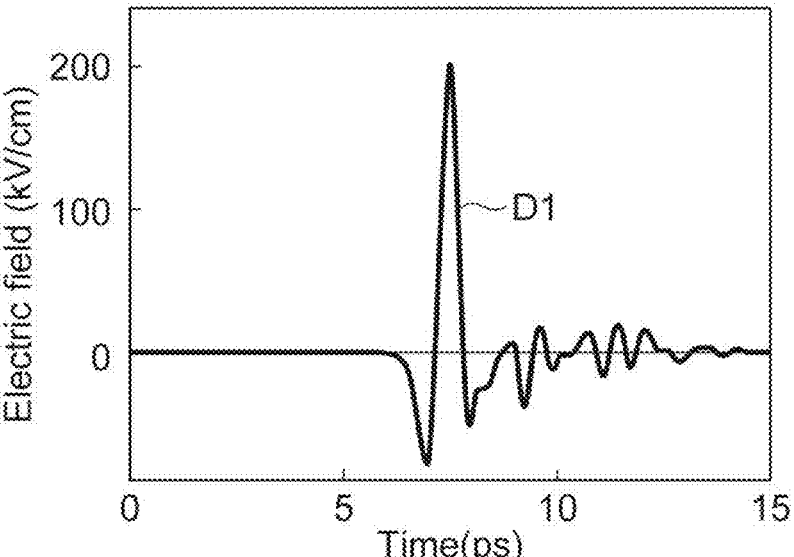
FIG. 10A is a view illustrating a waveform of an electric field of an electromagnetic wave entering an electromagnetic wave detection device.

FIG. 10A illustrates an example of the electromagnetic wave W entering the electron emitter 20. In FIG. 10A, the data D1 indicates a waveform of the electric field of the electromagnetic wave W entering the electron emitter 20. In FIG. 10A, a vertical axis indicates an electric field strength and a horizontal axis indicates a time.

Figure 10B:
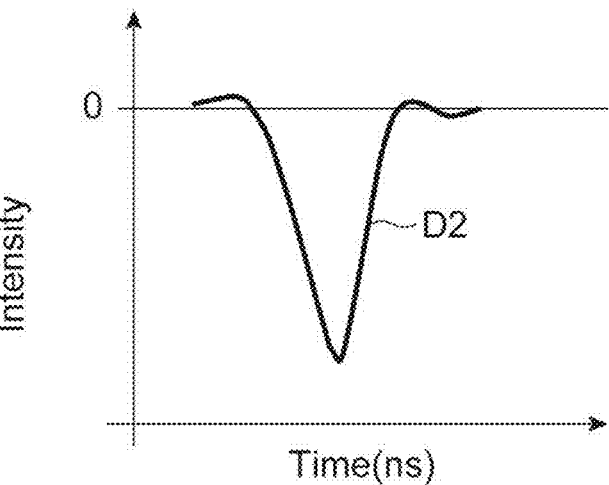
FIG. 10B is a view illustrating a result of detection of the electric field of the electromagnetic wave entering the electromagnetic wave detection device.

FIG. 10B illustrates an example of a result of computation in the process S6. In FIG. 10B, the data D2 indicates a result of computation in a case where the electromagnetic wave W illustrated in FIG. 10A enters the electron emitter 20. In FIG. 10B, a vertical axis indicates a strength of a signal, and a horizontal axis indicates a time. The signal strength of the data D2 is associated with the positive component in the Z-axis direction of the electric field strength of the electromagnetic wave W entering the electron emitter 20. For example, the positive component in the Z-axis direction of the electric field strength of the electromagnetic wave W entering the electron emitter 20 can be estimated by calculating a value of time integral of the data D2.

Figure 10C:
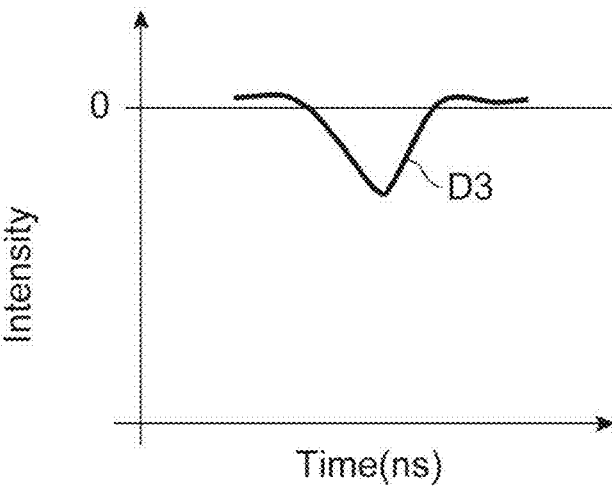
FIG. 10C is a view illustrating a result of detection of the electric field of the electromagnetic wave entering the electromagnetic wave detection device.

FIG. 10C illustrates an example of a result of computation in the process S11. In FIG. 10C, the data D3 is a result of computation in a case where the electromagnetic wave W illustrated in FIG. 10A enters the electron emitter 20. In FIG. 10C, a vertical axis indicates a strength of a signal, and a horizontal axis indicates a time. The signal strength of the data D3 is associated with the negative component in the Z-axis direction of the electric field strength of the electromagnetic wave W entering the electron emitter 20. For example, the negative component in the Z-axis direction of the electric field strength of the electromagnetic wave W entering the electron emitter 20 can be estimated by calculating a value of time integral of the data D3. For example, a rate between a positive component in a predetermined direction and a negative component in a predetermined direction can be determined for the electric field strength of the entered electromagnetic wave W can be determined by comparing the data D2 with the data D3. For example, a rate between the positive component in the Z-axis direction and the negative component in the Z-axis direction can be determined for the electric field strength of the entered electromagnetic wave W by comparing the value of time integral of the data D2 with the value of time integral of the data D3.

Operation and Effect

In the photoelectric conversion device 2, the electric field from the bias portion P2 toward the antenna portion P1 is controlled by the control of the electric potentials by means of the potential control unit 62. When the electromagnetic wave W to be measured enters the meta-surface 22, the electron E is emitted from the antenna portion P1 by the influence of the electric field from the bias portion P2 toward the antenna portion P1. In the first state, the component of the electric field from the bias portion P2 toward the antenna portion P1 in the Z-axis direction is positive. As a result, when the electromagnetic wave W enters the meta-surface 22 in the first state, the electron E is emitted from the antenna portion P1 according to the positive component of the electric field strength of the entered electromagnetic wave W in the Z-axis direction. In the second state, the component of the electric field from the bias portion P2 toward the antenna portion P1 in the Z-axis direction is negative. As a result, when the electromagnetic wave W enters the meta-surface 22 in the second state, the electron E is emitted from the antenna portion P1 according to the negative component of the electric field strength of the entered electromagnetic wave W in the Z-axis direction. Thus, the electron E is detected in the first state according to the positive component of the electric field strength of the entered electromagnetic wave W in the Z-axis direction, and the electron E is detected in the second state according to the negative component of the electric field strength of the entered electromagnetic wave W in the Z-axis direction. As a result, the measurement of the electric field strength of the electromagnetic wave W entering the meta-surface 22 can be achieved for each polarity by detecting the electron E emitted from the meta-surface 22 in each of the first state and the second state. The photoelectric conversion device 2 is not required to be cooled.

For example, in the configuration illustrated in FIG. 3, the antenna portion P1 includes the leading ends 38 and 39 which are disposed at the mutually different positions in the Z-axis direction. The bias portion P2 includes the bias portion P2 configured by the linear part 43 and the bias portion P2 configured by the linear part 46. The bias portion P2 configured by the linear part 43 faces the leading end 38. The bias portion P2 configured by the linear part 46 faces the leading end 39. In the first state, the component of the electric field from the leading end 38 toward the bias portion P2 configured by the linear part 43 in the Z-axis direction is positive. In the first state, the component of the electric field from the bias portion P2 configured by the linear part 46 toward the leading end 39 in the Z-axis direction is positive. In the second state, the component of the electric field from the bias portion P2 configured by the linear part 43 toward the leading end 38 in the Z-axis direction is negative. In the second state, the component of the electric field from the leading end 39 toward the bias portion P2 configured by the linear part 46 in the Z-axis direction is negative. In this case, the electron E is emitted from the leading end 39 according to the positive component of the electric field strength of the entered electromagnetic wave W in the Z-axis direction, and the electron E is emitted from the leading end 38 according to the negative component of the electric field strength of the entered electromagnetic wave W in the Z-axis direction. When the electromagnetic wave W enters the meta-surface 22 in the first state, the electron E is emitted from the leading end 39 according to the positive component of the electric field strength of the entered electromagnetic wave W in the Z-axis direction. In the first state, the emission of electron from the leading end 38 is suppressed. When the electromagnetic wave W enters the meta-surface 22 in the second state, the electron E according to the negative component in the Z-axis direction of the electric field strength of the entered electromagnetic wave W is emitted from the leading end 38. In the second state, the emission of electron from the leading end 39 is suppressed. In the configuration illustrated in FIG. 5, the same operations and effects can be also achieved.

For example, in the configuration illustrated in FIG. 3, the leading ends 38 and 39, and the bias portion P2 are disposed in the order of the bias portion P2 configured by the linear part 46, the leading end 39, the leading end 38, and the bias portion P2 configured by the linear part 43 in the Z-axis direction. In the first state, the electric potential applied to the bias portion P2 configured by the linear part 43 is lower than the electric potential applied to the antenna portion P1, and the electric potential applied to the bias portion P2 configured by the linear part 46 is higher than the electric potential applied to the antenna portion P1. In the second state, the electric potential applied to the bias portion P2 configured by the linear part 43 is higher than the electric potential applied to the antenna portion P1, and the electric potential applied to the bias portion P2 configured by the linear part 46 is lower than the electric potential applied to the antenna portion P1. In this case, the electron E is emitted from the leading end 39 according to the positive component of the electric field strength of the entered electromagnetic wave W in the Z-axis direction, and the electron E is emitted from the leading end 38 according to the negative component of the electric field strength of the entered electromagnetic wave W in the Z-axis direction. When the electromagnetic wave W enters the meta-surface 22 in the first state, the electron E is emitted from the leading end 39 based on the electric field caused by the electric potential difference between the bias portion P2 configured by the linear part 46 and the leading end 39. In the first state, the emission of the electron E from the leading end 38 is suppressed by the electric field caused by the electric potential difference between the bias portion configured by the linear part 43 and the leading end 38. When the electromagnetic wave W enters the meta-surface 22 in the second state, the electron E is emitted from the leading end 38 based on the electric field caused by the electric potential difference between the bias portion P2 configured by the linear part 43 and the leading end 38. In the second state, the emission of electron from the leading end 39 is suppressed by the electric field caused by the electric potential difference between the bias portion P2 configured by the linear part 46 and the leading end 39. In the configuration illustrated in FIG. 5, the same operations and effects can also be achieved.

For example, in the configuration illustrated in FIG. 7, the plurality of patterns 31B and 32B include the linear part 42B and the linear part 45B which are spaced away from each other. The linear parts 42B and 45B extend in the Z-axis direction and face each other in the Z-axis direction. In the first state, the linear part 42B configures the antenna portion P1, and the linear part 45B configures the bias portion P2. In the second state, the linear part 42B configures the bias portion P2, and the linear part 45B configures the antenna portion P1. The photoelectric conversion device 2 is capable of achieving the measurement of the electric field strength of the electromagnetic wave W for each polarity with the further simple configuration.

The photoelectric conversion device 2 is further provided with the housing 10 which is airtightly sealed and has the window unit 11a transmitting the electromagnetic wave W therethrough. The electron emitter 20 is disposed within the housing 10. In this case, the amount of emission of the electron E in response to incidence of the electromagnetic wave W can be improved by making the housing 10 vacuum or filling the housing 10 with the gas.

The electromagnetic wave detection device 1 is provided with the photoelectric conversion device 2, the electron collecting unit 50 and the computing unit 70. The electron collecting unit 50 detects the electron E emitted from the electron emitter 20. The computing unit 70 computes the information relating to the positive component of the electric field strength of the electromagnetic wave W in the Z-axis direction, based on the result of detection of the electron collecting unit 50 in the first state. The computing unit 70 computes the information relating to the negative component of the electric field strength of the electromagnetic wave W in the Z-axis direction, based on the result of detection of the electron collecting unit 50 in the second state. In this case, the electromagnetic wave detection device 1 is capable of measuring the electric field strength of the electromagnetic wave W for each polarity with the simple configuration. The electromagnetic wave detection device 1 is not required to be cooled.

Although the embodiments and the modifications of the present invention have been described, the present invention is not necessarily limited to the embodiments and the modifications and various changes can be made without departing from the gist thereof.

For example, the configurations of the photoelectric conversion units 25, 25A and 25B can be appropriately combined. A part of the linear part 43 or the linear part 46 in the photoelectric conversion unit 25 may be configured to face the leading end of the antenna portion P1 only in one linear part such as the photoelectric conversion unit 25A.

In the photoelectric conversion unit 25, the linear part 48a and the linear part 48b positioned on the same line in the Z-axis direction may not be connected to each other. In this case, the linear part 48a and the linear part 48b may be connected to the different linear parts 47 from each other. In this case, the linear part 48a and the linear part 48b may be connected to the different electrodes 51 from each other via the linear part 47. The electron emitter 20 may be provided with a plurality of electrodes 51.

In the photoelectric conversion unit 25A, the linear part 49a and the linear part 49b positioned on the same line in the Z-axis direction may not be connected to each other. In this case, the linear part 49a and the linear part 49b may be connected to the different linear parts 47A from each other. In this case, the linear part 49a and the linear part 49b may be connected to the different electrodes 71 from each other via the linear part 47A. The electron emitter 20 may be provided with a plurality of electrodes 71.

What is claimed is:

1. A photoelectric conversion device comprising:
an electron emitter including a meta-surface emitting an electron in response to incidence of an electromagnetic wave; and
a potential control unit configured to control electric potentials applied to the meta-surface, wherein
the meta-surface includes a plurality of patterns spaced away from each other,
the plurality of patterns include an antenna portion extending in a predetermined direction and emitting an electron in response to incidence of the electromagnetic wave, and at least one bias portion facing the antenna portion,
the potential control unit is configured to switch a first state where a component of an electric field from the bias portion toward the antenna portion in the predetermined direction is positive, and a second state where the component of the electric field from the bias portion toward the antenna portion in the predetermined direction is negative, by controlling electric potentials applied to the plurality of patterns,
the antenna portion includes first and second leading ends disposed at mutually different positions in the predetermined direction,
the bias portion includes a first bias portion facing the first leading end, and a second bias portion facing the second leading end,
in the first state, the component of the electric field from the first leading end toward the first bias portion in the predetermined direction is positive, and the component of the electric field from the second bias portion toward the second leading end in the predetermined direction is positive, and in the second state, the component of the electric field from the first bias portion toward the first leading end in the predetermined direction is negative, and the component of the electric field from the second leading end toward the second bias portion in the predetermined direction is negative.

2. The photoelectric conversion device according to claim 1, wherein the first and second leading ends and the first and second bias portions are disposed in an order of the second bias portion, the second leading end, the first leading end and the first bias portion in the predetermined direction, in the first state, an electric potential applied to the first bias portion is lower than an electric potential applied to the antenna portion, and an electric potential applied to the second bias portion is higher than the electric potential applied to the antenna portion, and in the second state, the electric potential applied to the first bias portion is higher than the electric potential applied to the antenna portion, and the electric potential applied to the second bias portion is lower than the electric potential applied to the antenna portion.

3. The photoelectric conversion device according to claim 2, further comprising:

a housing configured to be airtightly sealed and have a window unit transmitting an electromagnetic wave therethrough, wherein the electron emitter is disposed within the housing.

4. An electromagnetic wave detection device comprising:

the photoelectric conversion device according to claim 2;

a detection unit configured to detect an electron emitted from the electron emitter; and a computing unit configured to compute, based on a result of detection of the detection unit in the first state, information relating to a positive component of an electric field strength of the electromagnetic wave in the predetermined direction, and to compute, based on a result of detection of the detection unit in the second state, information relating to a negative component of the electric field strength of the electromagnetic wave in the predetermined direction.

5. The photoelectric conversion device according to claim 1, wherein the plurality of patterns include a first linear part and a second linear part which are spaced away from each other, the first and second linear parts extend in the predetermined direction and face each other in the predetermined direction, in the first state, the first linear part configures the antenna portion, and the second linear part configures the bias portion, and in the second state, the first linear part configures the bias portion, and the second linear part configures the antenna portion.

6. The photoelectric conversion device according to claim 5, further comprising:

a housing configured to be airtightly sealed and have a window unit transmitting an electromagnetic wave therethrough, wherein the electron emitter is disposed within the housing.

7. An electromagnetic wave detection device comprising:

the photoelectric conversion device according to claim 5;

a detection unit configured to detect an electron emitted from the electron emitter; and a computing unit configured to compute, based on a result of detection of the detection unit in the first state, information relating to a positive component of an electric field strength of the electromagnetic wave in the predetermined direction, and to compute, based on a result of detection of the detection unit in the second state, information relating to a negative component of the electric field strength of the electromagnetic wave in the predetermined direction.

8. The photoelectric conversion device according to claim 1, further comprising:

a housing configured to be airtightly sealed and have a window unit transmitting an electromagnetic wave therethrough, wherein the electron emitter is disposed within the housing.

9. An electromagnetic wave detection device comprising:

the photoelectric conversion device according to claim 1;

a detection unit configured to detect an electron emitted from the electron emitter; and a computing unit configured to compute, based on a result of detection of the detection unit in the first state, information relating to a positive component of an electric field strength of the electromagnetic wave in the predetermined direction, and to compute, based on a result of detection of the detection unit in the second state, information relating to a negative component of the electric field strength of the electromagnetic wave in the predetermined direction.

10. A photoelectric conversion method comprising:

a first electron emission step of using a meta-surface which includes a plurality of patterns including an antenna portion extending in a predetermined direction and at least one bias portion facing the antenna portion and emitting an electron from the antenna portion in response to incidence of an electromagnetic wave to be measured on the meta-surface in a first sate, the first state being a state where an electric potential is applied to the meta-surface in such a manner that a component of an electric field from the bias portion toward the antenna portion in the predetermined direction is positive; and a second electron emission step of using the meta-surface and emitting an electron from the antenna portion in response to incidence of the electromagnetic wave to be measured on the meta-surface in a second state, the second state being a state where an electric potential is applied to the meta-surface in such a manner that the component of the electric field from the bias portion toward the antenna portion in the predetermined direction is negative, wherein the antenna portion includes first and second leading ends disposed at mutually different positions in the predetermined direction, the bias portion includes a first bias portion facing the first leading end, and a second bias portion facing the second leading end, in the first electron emission step, an electric potential is applied to the meta-surface in such a manner that a component of an electric field from the first leading end toward the first bias portion in the predetermined direction is positive, and that a component of an electric field from the second bias portion toward the second leading end in the predetermined direction is positive, and in the second electron emission step, an electric potential is applied to the meta-surface in such a manner that a component of an electric field from the first bias portion toward the first leading end in the predetermined direction is negative, and that a component of an electric field from the second leading end toward the second bias portion in the predetermined direction is negative.

11. The photoelectric conversion method according to claim 10, wherein the first and second leading ends and the first and second bias portions are disposed in an order of the second bias portion, the second leading end, the first leading end and the first bias portion in the predetermined direction, in the first electron emission step, an electric potential applied to the first bias portion is lower than an electric potential applied to the antenna portion, and an electric potential applied to the second bias portion is higher than the electric potential applied to the antenna portion, and in the second electron emission step, the electric potential applied to the first bias portion is higher than the electric potential applied to the antenna portion, and the electric potential applied to the second bias portion is lower than the electric potential applied to the antenna portion.

12. An electromagnetic wave detection method comprising the photoelectric conversion method according to claim 11, wherein the electromagnetic wave detection method further comprises:

a first detection step of detecting an electron emitted from an electron emitter in the first electron emission step;

a second detection step of detecting an electron emitted from the electron emitter in the second electron emission step;

a first computing step of computing, based on a result of detection of the first detection step in the first state, information relating to a positive component of an electric field strength of the electromagnetic wave in the predetermined direction; and a second computing step of computing, based on a result of detection of the second detection step in the second state, information relating to a negative component of the electric field strength of the electromagnetic wave in the predetermined direction.

13. The photoelectric conversion method according to claim 10, wherein the plurality of patterns include a first linear part and a second linear part spaced away from each other, the first and second linear parts extend in the predetermined direction and face each other in the predetermined direction, in the first electron emission step, the first linear part configures the antenna portion, and the second linear part configures the bias portion, and in the second electron emission step, the first linear part configures the bias portion, and the second linear part configures the antenna portion.

14. An electromagnetic wave detection method comprising the photoelectric conversion method according to claim 13, wherein the electromagnetic wave detection method further comprises:

a first detection step of detecting an electron emitted from an electron emitter in the first electron emission step;

a second detection step of detecting an electron emitted from the electron emitter in the second electron emission step;

a first computing step of computing, based on a result of detection of the first detection step in the first state, information relating to a positive component of an electric field strength of the electromagnetic wave in the predetermined direction; and a second computing step of computing, based on a result of detection of the second detection step in the second state, information relating to a negative component of the electric field strength of the electromagnetic wave in the predetermined direction.

15. An electromagnetic wave detection method comprising the photoelectric conversion method according to claim 10, wherein the electromagnetic wave detection method further comprises:

a first detection step of detecting an electron emitted from an electron emitter in the first electron emission step;

a second detection step of detecting an electron emitted from the electron emitter in the second electron emission step;

a first computing step of computing, based on a result of detection of the first detection step in the first state, information relating to a positive component of an electric field strength of the electromagnetic wave in the predetermined direction; and a second computing step of computing, based on a result of detection of the second detection step in the second state, information relating to a negative component of the electric field strength of the electromagnetic wave in the predetermined direction.

\*    \*    \*    \*    \*